United States Patent [19]
Inoue et al.

[11] Patent Number: 5,123,254
[45] Date of Patent: Jun. 23, 1992

[54] AIR CONDITIONING APPARATUS CONNECTING ONE OUTDOOR UNIT WITH SEVERAL INDOOR UNITS THROUGH SEVERAL REFRIGERANT TUBES AND SIGNAL CONDUCTORS

[75] Inventors: Tsunetoshi Inoue; Norihisa Hasegawa, both of Fuji, Japan

[73] Assignee: Kabushiki Kaisha Toshiba, Kawasaki, Japan

[21] Appl. No.: 636,319

[22] Filed: Dec. 31, 1990

[30] Foreign Application Priority Data

Feb. 14, 1990 [JP] Japan ................... 2-31481
Feb. 14, 1990 [JP] Japan ................... 2-31482
Feb. 14, 1990 [JP] Japan ................... 2-31489

[51] Int. Cl.$^5$ .......................... F25B 49/00
[52] U.S. Cl. .......................... 62/126; 62/129; 62/160; 62/157; 165/11.1; 165/28
[58] Field of Search ............... 62/127, 125, 126, 129, 62/77, 298, 160, 200, 199, 231, 157, 228.1, 228.4, 228.5; 165/11.1, 27, 28; 236/91 R, 91 D, 1 B

[56] References Cited

U.S. PATENT DOCUMENTS 4,211,089 7/1980 Mueller et al. .......... 62/126 X
5,005,366 4/1991 Murashige ............. 62/298 X

FOREIGN PATENT DOCUMENTS 0219202 4/1987 European Pat. Off. .
61-54147 11/1986 Japan .
63-113843 7/1988 Japan .
2027216 2/1980 United Kingdom .
2120794 12/1983 United Kingdom .
2220085 12/1989 United Kingdom .

Primary Examiner—Albert J. Makay
Assistant Examiner—John Sollecito
Attorney, Agent, or Firm—Cushman, Darby & Cushman

[57] ABSTRACT

An air conditioning apparatus in which one outdoor unit is connected to several indoor units through respective refrigerant tubes and signal conductors. The outdoor unit has compressors for discharging refrigerant and an outdoor heat exchanger. Each outdoor unit has an indoor heat exchanger and an indoor heat exchanger temperature sensor. When an operating device signals a check node, the compressors are stopped for a predetermined time period. Then the compressors are operated to sequentially discharge refrigerant to each indoor unit. A checking device then monitors the signal conductors of each indoor unit for a signal indicating a certain temperature condition. Based on the signals received, the checking device determines whether the indoor units are properly connected to the outdoor unit.

10 Claims, 33 Drawing Sheets

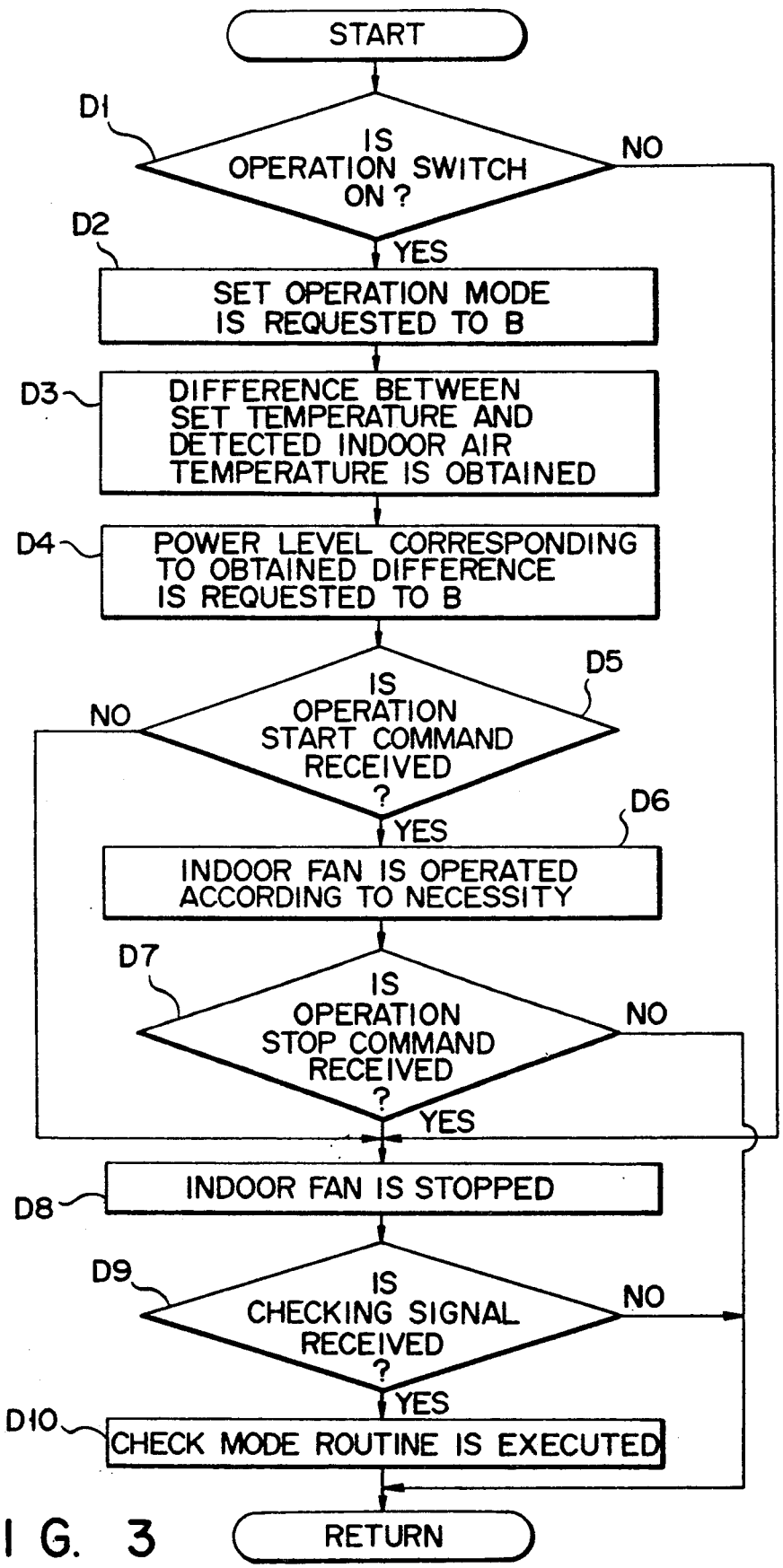
F I G. 3

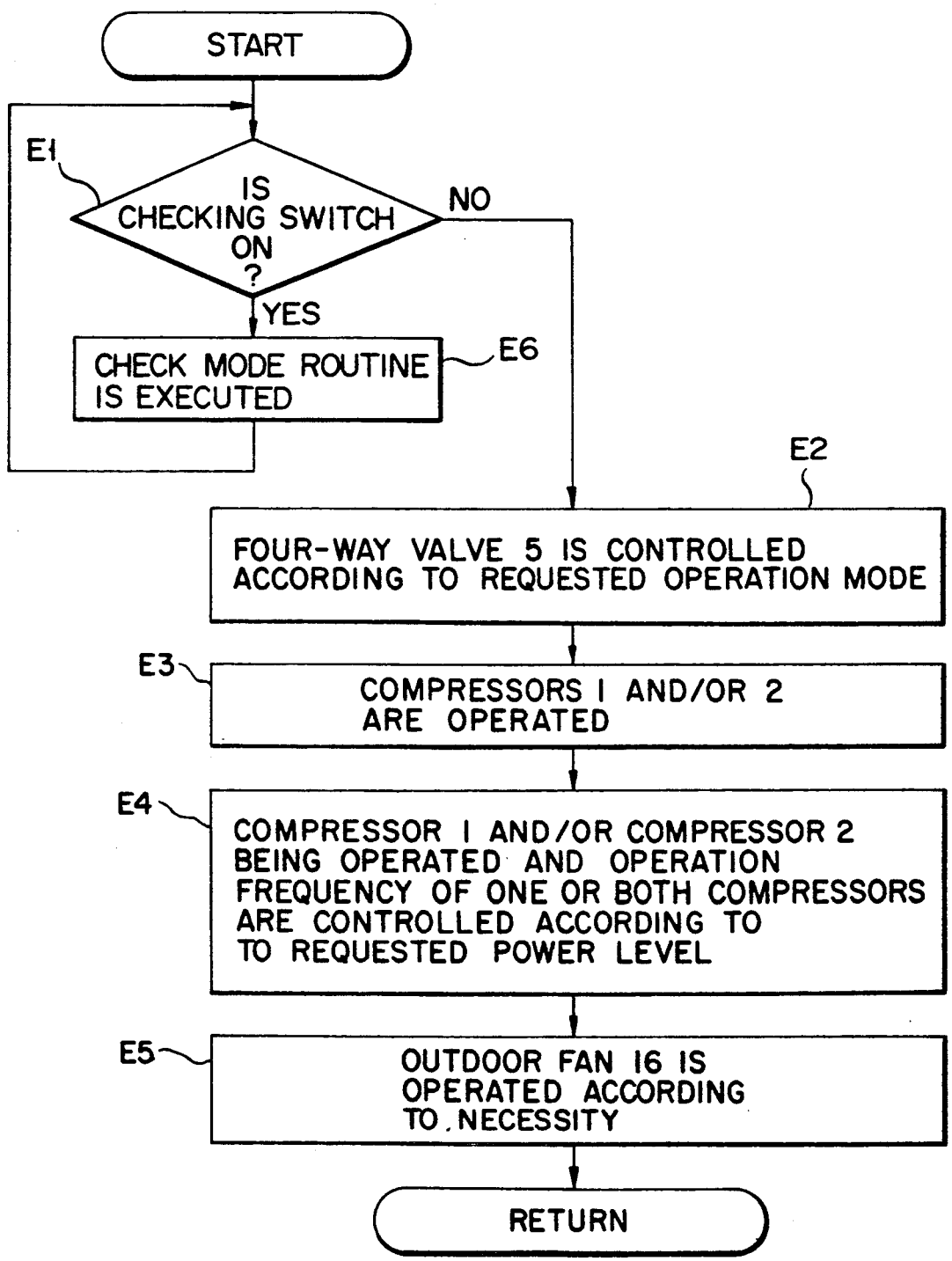
F I G. 5

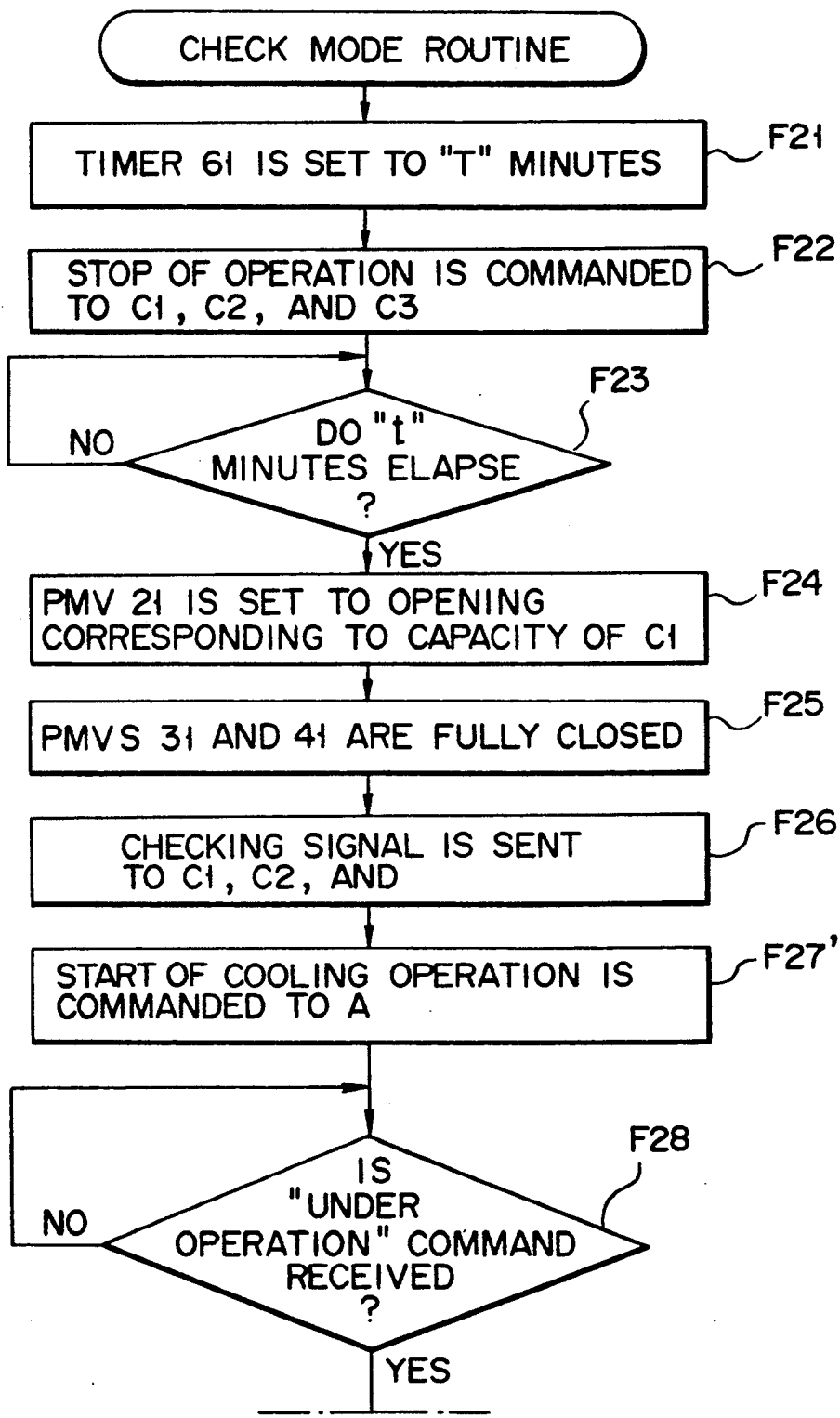
F I G. 10A

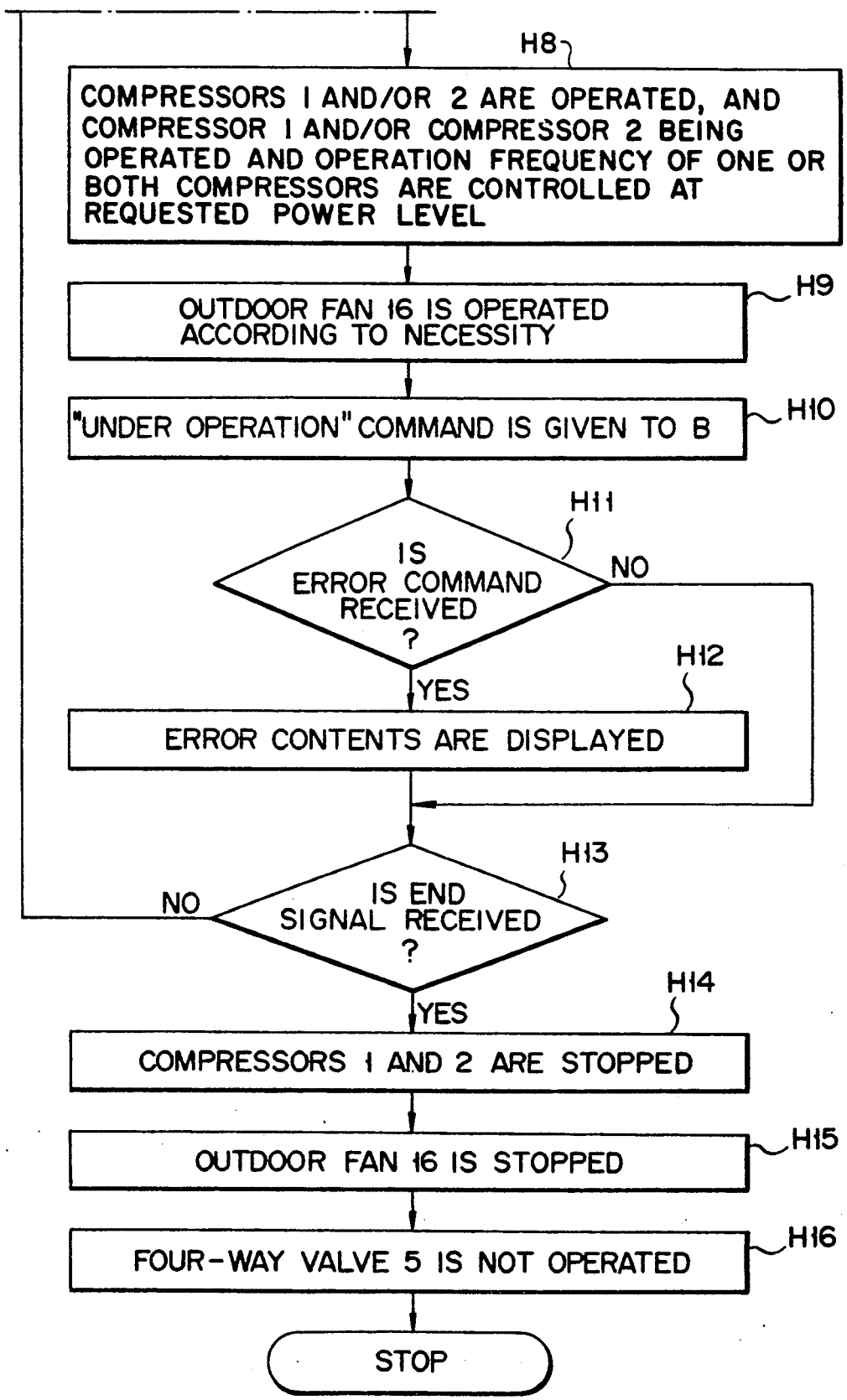
F I G. 11B

AIR CONDITIONING APPARATUS CONNECTING ONE OUTDOOR UNIT WITH SEVERAL INDOOR UNITS THROUGH SEVERAL REFRIGERANT TUBES AND SIGNAL CONDUCTORS

BACKGROUND OF THE INVENTION

1. Field of the Invention

The present invention relates to a multiple-type air conditioning apparatus comprising one outdoor unit and several indoor units.

2. Description of the Related Art

Said multiple-type air conditioning apparatus connects one outdoor unit with several indoor units through several refrigerant tubes and signal conductors.

Said signal conductors are used to send commands and signals related to operation.

To install said air conditioning apparatus in a building, refrigerant tubes must properly be connected between the outdoor unit and several indoor units, and signal conductors must also be properly connected between the outdoor unit and several indoor units.

However, refrigerant tubes may be abnormally connected due to erroneous work, or signal conductors may be abnormally connected due to erroneous wiring.

If any of the above error occurs, the air conditioning apparatus will not function properly. Therefore, it is necessary to carefully check out the connection state of the refrigerant tubes and signal conductors by executing test operations after installing the air conditioning apparatus.

However, the above checkout is very troublesome and errors may be overlooked by human operators.

Therefore, an air conditioning apparatus is developed which automatically checks the connection state between one outdoor unit and several indoor units.

For example, an air conditioning apparatus disclosed in the official gazette of Japanese Patent TOKKOSHO 61-54147, checks the connection state between one outdoor unit 2 and several indoor units 1, 1' by sequentially flowing refrigerant through several indoor units 1, 1' to monitor the temperature change in several indoor units 1, 1'.

In this publication, however, only the method of checking the connection state is disclosed, no concrete control method is disclosed showing the relation between the checking of the connection state and the normal air conditioning operation. Therefore, there may occur an erroneous detection of the connection state.

The air conditioning apparatus disclosed in the official gazette of Japanese Patent JIKKAISHO 63-113843 is equipped with several outdoor units X and Y, in which the outdoor unit X connects with the indoor units A through F and the outdoor unit Y connects with the indoor units G through L.

The air conditioning apparatus checks which outdoor unit an indoor unit outputting the operation command is connected to, X or Y, by monitoring the suction-side pressure of the compressor 1 of the outdoor unit X and that of the compressor 1 of the outdoor unit Y.

However, this air conditioning apparatus cannot check which outdoor unit an indoor unit is connected to, X or Y. Therefore, it is impossible to check the connection state between the outdoor unit X and the indoor units A through F and between the outdoor unit Y and the indoor units G through L.

SUMMARY OF THE INVENTION

It is the object of the present invention to greatly decrease an operator's load and realize proper operation after installation by automatically, quickly, and accurately checking the connection state between one outdoor unit and several indoor units.

The present invention comprises:

compressors installed on an outdoor unit, which take in, compress, and discharge refrigerant, an outdoor heat exchanger installed on said outdoor unit, which exchanges the heat of incoming refrigerant for that of outdoor air, several indoor heat exchangers installed on several indoor units respectively, which exchange the heat of incoming refrigerant for that of indoor air, a refrigeration cycle connecting said compressors of, said outdoor and said indoor heat exchangers by refrigerant tubes, several temperature sensors installed on said indoor units respectively, which detect the temperature of said indoor heat exchangers, an operating means to be operated to check connection errors between said outdoor unit and said indoor units, a means to sequentially flow refrigerant through said indoor units by temporarily stopping said compressor before restarting it when said operating means is operated, means installed on each said indoor units, which outputs the signal to indicate that the temperature change detected by an associated temperature sensor exceeds a certain value and sends the signal to an associated signal conductor when said operating means is operated, and a means to check if said outdoor unit is normally connected to said indoor units by monitoring tee signal of said signal conductors when said operating means is operated.

Other objects, features, and characteristics of the present invention, as well as methods, operation, and functions of the related elements of the structure, and the combination of parts and economies of manufacture, will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flow chart showing the control of indoor units in each embodiment;

FIG. 5 is a flow chart showing the control of the odd in each embodiment;

FIGS. 10A, 10B, 10C, and 10D are flow charts showing the check mode routine for the branch unit in the second embodiment:

FIGS. 11A and 11B are flow charts showing the check mode routine for the odd in the third embodiment;

DETAILED DESCRIPTION OF THE PREFERRED EMBODIMENT

The following is the description of the first embodiment according to drawings.

Figure 1:
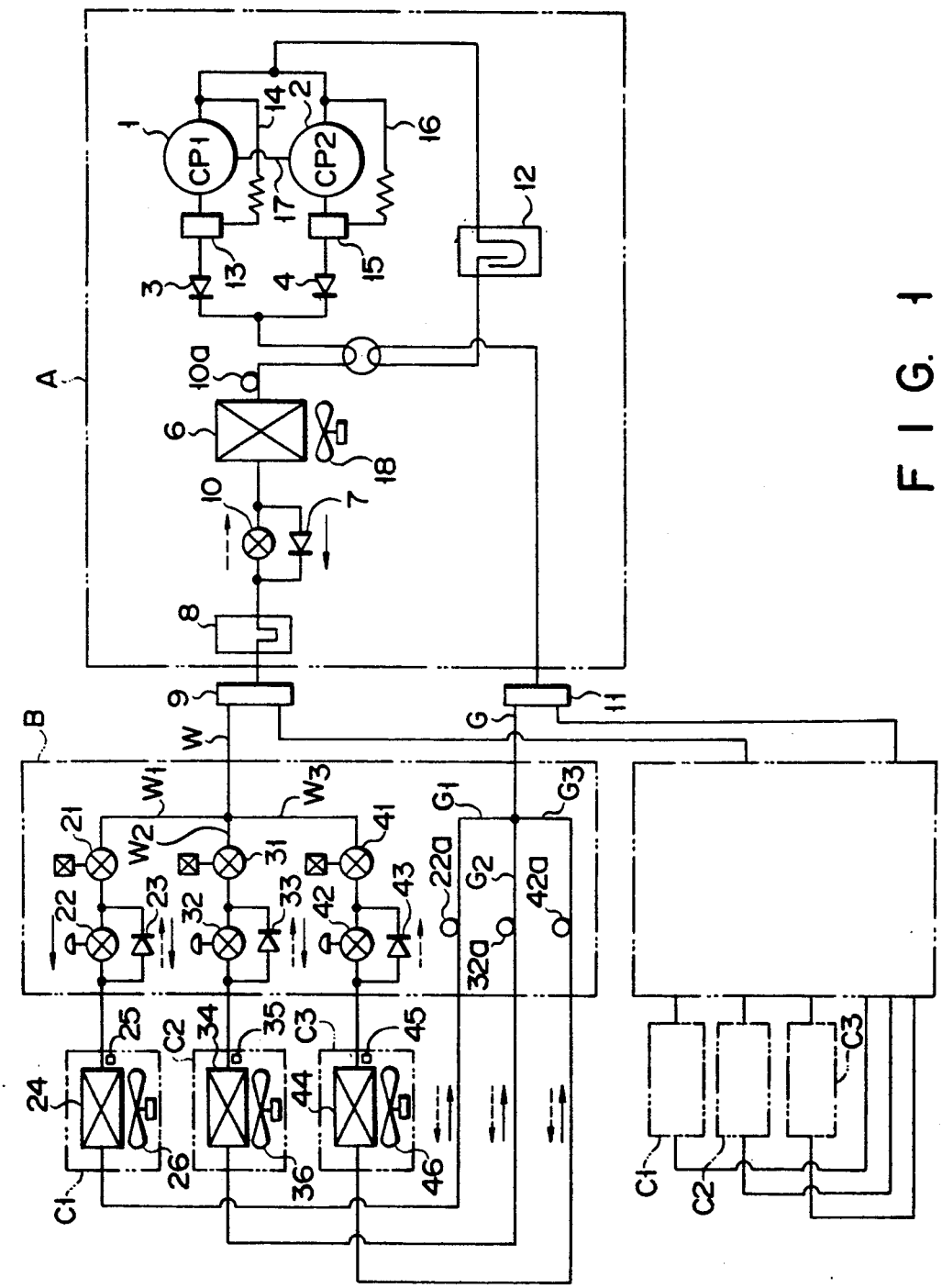
FIG. 1 shows the configuration of the refrigeration cycle and the flow of refrigerant in the first through fifth embodiments of the present invention.

In FIG. 1, A is an outdoor unit. The branch unit B is connected to the outdoor unit A through refrigerant tubes. The branch unit B connects with the indoor units $C_1$, $C_2$, and $C_3$ through refrigerant tubes.

In the outdoor unit A, branch unit B, and indoor units $C_1$, $C_2$ and $C_3$, the following heat-pump-type refrigeration cycle is configured.

The outdoor unit A has the variable-capacity-type compressors 1 and 2. The compressors 1 and 2 take in refrigerant from an intake, compress it, and discharge it from an outlet.

The outdoor heat exchanger 6 is connected to the outlet of the compressors 1 and 2 through the forward check valves 3 and 4 and the four-way valve 5, which exchanges the heat of incoming refrigerant for that of outdoor air.

The liquid tank 8 is connected to the outdoor heat exchanger 6 through the forward check valve 7. The header 9 is connected to the liquid tank 8.

The expansion valve 10 is connected between the liquid tank 8 and the outdoor heat exchanger 6.

The liquid-side tube W is connected to said header 9. The liquid-side tube W is branched to three liquid-side tubes—$W_1$, $W_2$, and $W_3$.

The liquid-side tubes $W_1$, $W_2$, and $W_3$ connect with the indoor heat exchangers 24, 34, and 44 of the indoor units $C_1$, $C_2$, and $C_3$ through the pulse motor valves (hereafter called PMV) 21, 31, and 41 and the expansion valves 22, 32, and 42. The indoor heat exchangers 24, 34, and 44 exchange the heat of incoming refrigerant for that of indoor air.

The forward check valves 23, 33, and 43 are connected between the indoor heat exchangers 24, 34, and 44 and the PMVs 21, 31, and 41.

The gas-side tubes $G_1$, $G_2$, and $G_3$ are connected to the indoor heat exchangers 24, 34, and 44.

The gas-side tubes $G_1$ through $G_3$ are connected to the gas-side tube G.

The gas-side tube G is connected to the header 11. The header 11 is connected to the inlet of the compressors 1 and 2 through said four-way valve 5 and the accumulator 12.

That is, unless the four-way valve 5 operates, refrigerant flows in the direction of the arrow shown by a continuous line in the drawing and cooling operation is set. When the four-way valve 5 is operated and switched, refrigerant flows in the direction of the arrow shown by a broken line in the drawing and heating operation is set.

The oil separator 13 is installed on the tube between the outlet of the compressor 1 and the check valve 3. The oil bypass 14 is connected between the oil separator 13 and the inlet of the compressor 1.

The oil separator 15 is installed on the tube between the outlet of the compressor 2 and the check valve 4. The oil bypass 16 is connected between the oil separator 15 and the inlet of the compressor 2.

The tube 17 is connected between the reference oil level positions of the cases of the compressors 1 and 2. The tube 17 flows the lubricating oil of the compressors 1 and 2 alternately.

The outdoor fan 18 is installed on the outdoor unit A to circulate outdoor air through the outdoor heat exchanger 6.

The heat sensitive element 10a is installed on the tube between the four-way valve 5 and the outdoor heat exchanger 6. The heat sensitive element 10a is an accessory of the expansion valve 10. The expansion valve 10 detects the difference between the temperature detected by the heat sensitive element 10a and that of the refrigerant flowing through the expansion valve 10, that is, the degree of superheat of the refrigerant flowing through the outdoor heat exchanger 6. Moreover, the expansion valve 10 controls the quantity of the refrigerant flowing through the outdoor heat exchanger 6 so that the detected degree of superheat will be constant.

In the branch unit B, the heat sensitive elements 22a, 32a, and 42a are installed on the gas-side tubes $G_1$ through $G_3$.

The heat sensitive elements 22a, 32a, and 42a are accessories of the expansion valves 22, 32, and 42.

The expansion valves 22, 32, and 42 detect the difference between the temperature detected by the heat sensitive elements 22a, 32a, and 42a and that of the refrigerant flowing through the expansion valves 22, 32, and 42. Moreover, the expansion valves 22, 32, and 42 control the quantity of the refrigerant flowing through the outdoor heat exchangers 24, 34, and 44 so that the detected degree of superheat will be constant.

In the indoor units $C_1$ through $C_3$, the temperature sensors 25, 35, and 45 are installed on the indoor heat exchangers 24, 34, and 44. The heat sensors 25, 35, and 45 respectively detect the temperature of each indoor heat exchanger.

The indoor fans 26, 36, and 46 are installed on the indoor units $C_1$ through $C_3$ to circulate indoor air through the indoor heat exchangers 24, 34, and 44.

Figure 2:
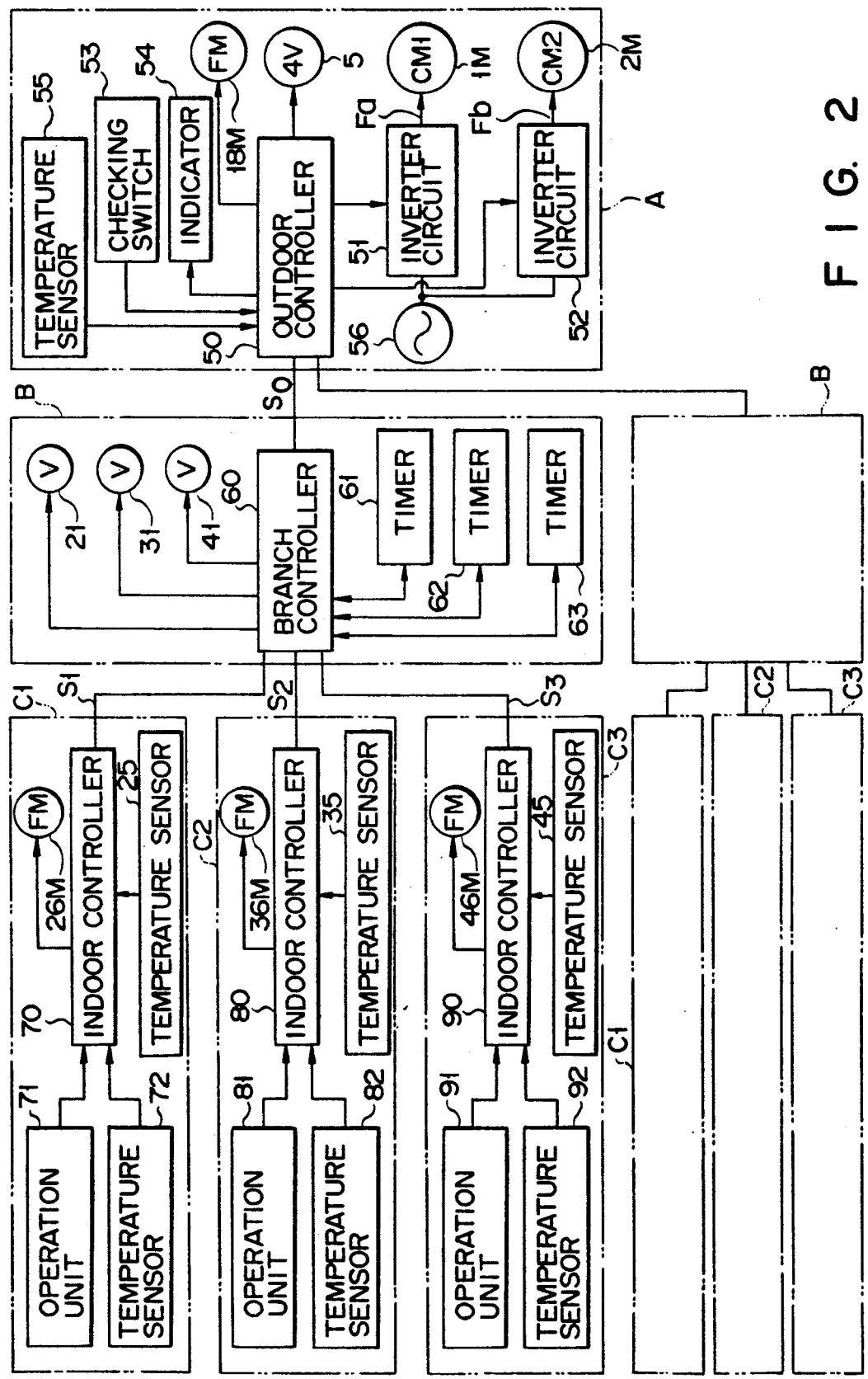
FIG. 2 is a block diagram showing the control circuit in each embodiment.

FIG. 2 shows a control circuit.

The outdoor unit A has the outdoor controller 50. The outdoor controller 50 comprises a microcomputer and its peripheral circuits.

The branch controller 60 of the branch unit B is connected to the outdoor controller 50 through the signal conductor $S_0$. The branch controller 60 comprises a microcomputer and its peripheral circuits.

The indoor controller 70, 80, and 90 of the indoor units $C_1$ through $C_3$ are connected to the branch controller 60 through the signal conductors $S_1$, $S_2$, and $S_3$ respectively. The indoor controller 70, 80, and 90 comprise a microcomputer and its peripheral circuits respectively.

The outdoor controller 50 connects with the four-way valve 5, the inverter circuits 51 and 52, the checking switching 53 which is an operating means, the indicator 54, the temperature sensor 55, and the outdoor fan motor 18M.

The inverter circuit 51 and 52 rectifies the voltage of the AC power supply 56 and converts the voltage into the voltage with the prescribed frequency corresponding to the command from the outdoor controller 50 before outputting it. The output voltages of the inverter circuits 51 and 52 are supplied to the compressor motors 1M and 2M respectively as the driving power.

The checking switch 53 is operated to check if the indoor units $C_1$ through $C_3$ are normally connected to the outdoor unit A.

The temperature sensor 55 detects the temperature of outdoor air.

The branch controller 60 connects with the PMVs 11, 21, and 31, and the timers 61 through 63.

The indoor controllers 70, 80, and 90 connect with the operation units 71, 81, and 91, the temperature sensors, 72, 82, 92, said temperature sensors 15, 25, and 35, and the indoor fan motors 26M, 36M, and 46M.

The temperature sensors 72, 82, and 92 detect the temperature of indoor air.

The following is the description of operations.

First, the control by the indoor controllers 70, 80, and 90 is described according to FIG. 3.

When the operation switch of the operation unit 71 is turned on (step D1), the operation mode set in the operation unit 71 (cooling- or heating-operation mode) is requested to the branch unit B (step D2). Then, the difference between the temperature set in the operation unit 71 and indoor air temperature detected by the temperature sensor 72 is obtained (step D3) and the power level corresponding to the difference (cooling power level or heating power level) is requested to the branch unit B (step D4).

When the operation start command is given to the indoor controller 70 from the branch unit B (step D5), the indoor fan 26 is operated according to necessity (step D6).

When the operation stop command is given to the indoor controller 70 from the branch unit B (step D7), the indoor fan 26 is stopped (step D8).

Figure 4:
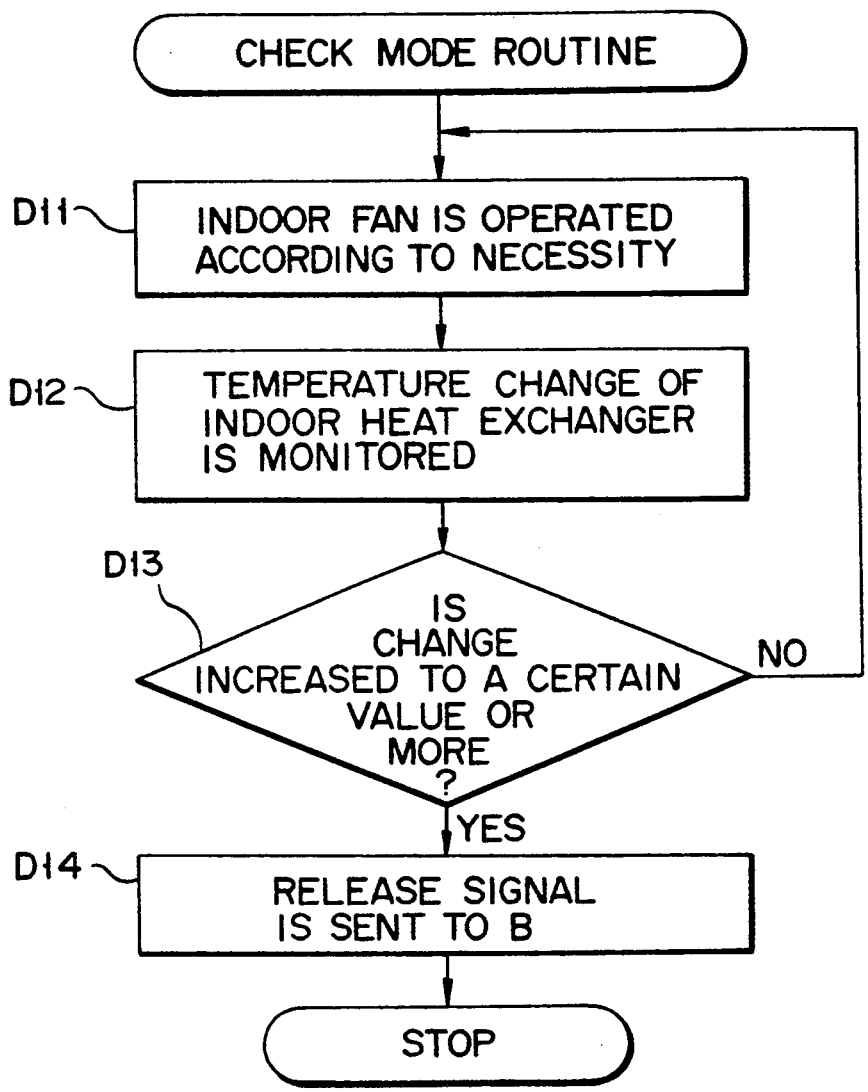
FIG. 4 is a flow chart showing the check mode routine for indoor units in each embodiment.

When the checking signal is given to the indoor controller 70 from the branch unit B (step D9), the check mode routine is executed (step D10). FIG. 4 shows the check mode routine.

In the check mode routine, the indoor fan 26 is operated according to necessity (step D11) and the change of the temperature (temperature of the indoor heat exchanger 24) detected by the temperature sensor 25 is monitored (step D12). When the temperature decreases to a certain value or lower (step D13), the release signal indicating the temperature change is sent to the branch unit B through the signal conductor $S_1$ (step D14).

When the operation switch of the operation unit 81 is turned on (step D1), the operation mode (cooling- or heating-operation mode) set in the operation unit 81 is requested to the branch unit B (step D2). Then, the difference between the temperature set in the operation unit 81 and the indoor air temperature detected by the temperature sensor 82 is obtained (step D3) and the power level corresponding to the difference (cooling power level or heating power level) is requested to the branch unit B (step D4).

When the operation start command is given to the indoor controller 80 from the branch unit B (step D5), the indoor fan 36 is operated according to necessity (step D6).

When the operation stop command is given to the indoor controller 80 from the branch unit B (step D7), the indoor fan 36 is stopped (step D8).

When the checking signal is given to the indoor controller 80 from the branch unit B (step D9), the check mode routine is executed (step D10). FIG. 4 shows the check mode routine.

In the check mode routine, the indoor fan 36 is operated according to necessity (step D11 and the change of the temperature (temperature of the indoor heat exchanger 34) detected by the temperature sensor 35 is monitored (step D12). When the temperature decreases to a certain value or lower (step D13), the release signal indicating the temperature decrease is sent to the branch unit B through the signal conductor $S_2$ (step D14).

When the operation switch of the operation unit 91 is turned on (step D1), the operation mode (cooling- or heating-operation mode) set in the operation unit 91 is requested to the branch unit B (step D2). Then, the difference between the temperature set in the operation unit 81 and the indoor air temperature detected by the temperature sensor 92 is obtained (step D3) and the power level corresponding to the difference (cooling power level or heating power level) is requested to the branch unit B (step D4).

When the operation start command is given to the indoor controller 90 from the branch unit B (step D5), the indoor fan 46 is operated according to necessity (step D6).

When the operation stop command is given to the indoor controller 90 from the branch unit B (step D7), the indoor fan 46 is stopped (step D8).

When the checking signal is given to the indoor controller 90 from the branch unit B (step D9), the check mode routine is executed (step D10). FIG. 4 shows the check mode routine.

In the check mode routine, the indoor fan 46 is operated according to necessity (step D11) and the change of the temperature (temperature of the indoor heat exchanger 44) detected by the temperature sensor 45 is monitored (step D12). When the temperature decreases to a certain value or lower (step D13), the release signal indicating the temperature decrease is sent to the branch unit B through the signal conductor $S_3$ (step D14).

Secondly, the control by the outdoor controller 50 is described below according to FIG. 5.

Unless the checking switch 53 is turned on (step E1), the four-way valve 5 is controlled according to the operation mode requested from the branch unit B (step E2). For example, the four-way valve 5 is not operated when the cooling operation mode is requested but it is operated when the heating operation mode is requested.

At the same time, the compressors 1 and/or 2 are operated (step E3).

The compressor 1 and/or compressor 2 being operated and the operation of one or both compressors frequency (output frequency of the inverter circuits 51 and 52) are controlled according to the power level requested from the branch unit B (step E4).

Figure 6:
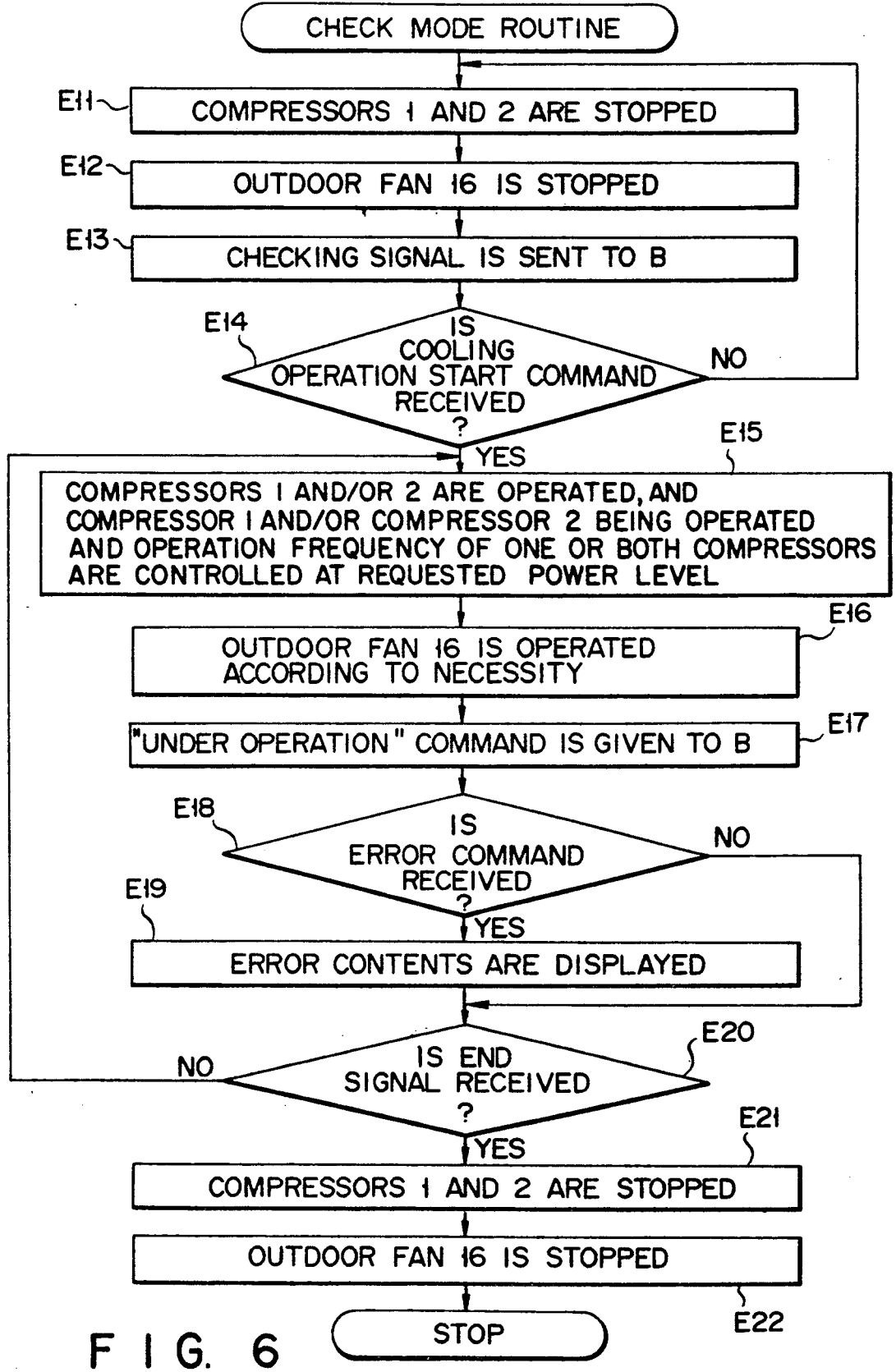
FIG. 6 is a flow chart showing the check mode routine for the odd in the first embodiment.

Also, the outdoor fan 16 is operated according to necessity. When the checking switch 53 is turned on (step E1), the check mode routine is executed (step E6). FIG. 6 shows the check mode routine.

In the check mode routine, the compressors 1 and 2 are stopped (step E11), the outdoor fan 16 is stopped (step E12), and the checking signal is sent to the branch unit B (step E13).

When the cooling-operation start command is given from the branch unit B (step E14), the compressors 1 and/or 2 are operated. Also, the compressor 1 and/or compressor 2 being operated and the operation frequency of one or both compressors are controlled according to the power level requested from the branch unit B (step E15). At the same time, the outdoor fan 16 is operated according to necessity (step E16).

When the operation is started, the command indicating "under operation" is given to the branch unit B (step E17).

When the command indicating an error is given from the branch unit B (step E18), the error contents to be commanded from the branch unit B is displayed on the indicator 54 (step E19).

When the end signal is given from the branch unit B (step E20), the compressors 1 and 2 are stopped (step E21) and the outdoor fan 16 is stopped (step E22).

Figure 7A:
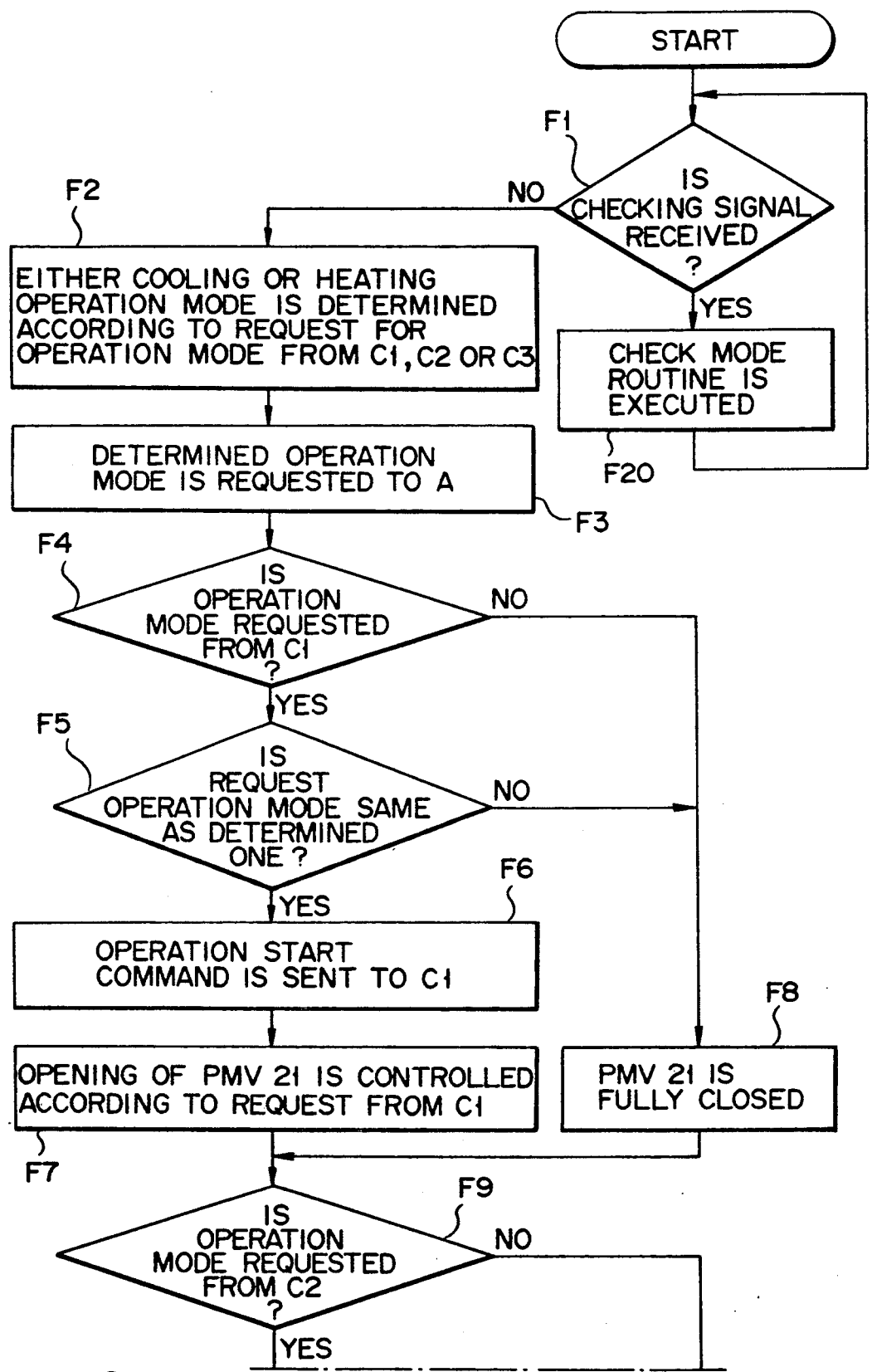
FIGS. 7A and 7B are flow charts showing the control of the branch unit in each embodiment.
Figure 7B:
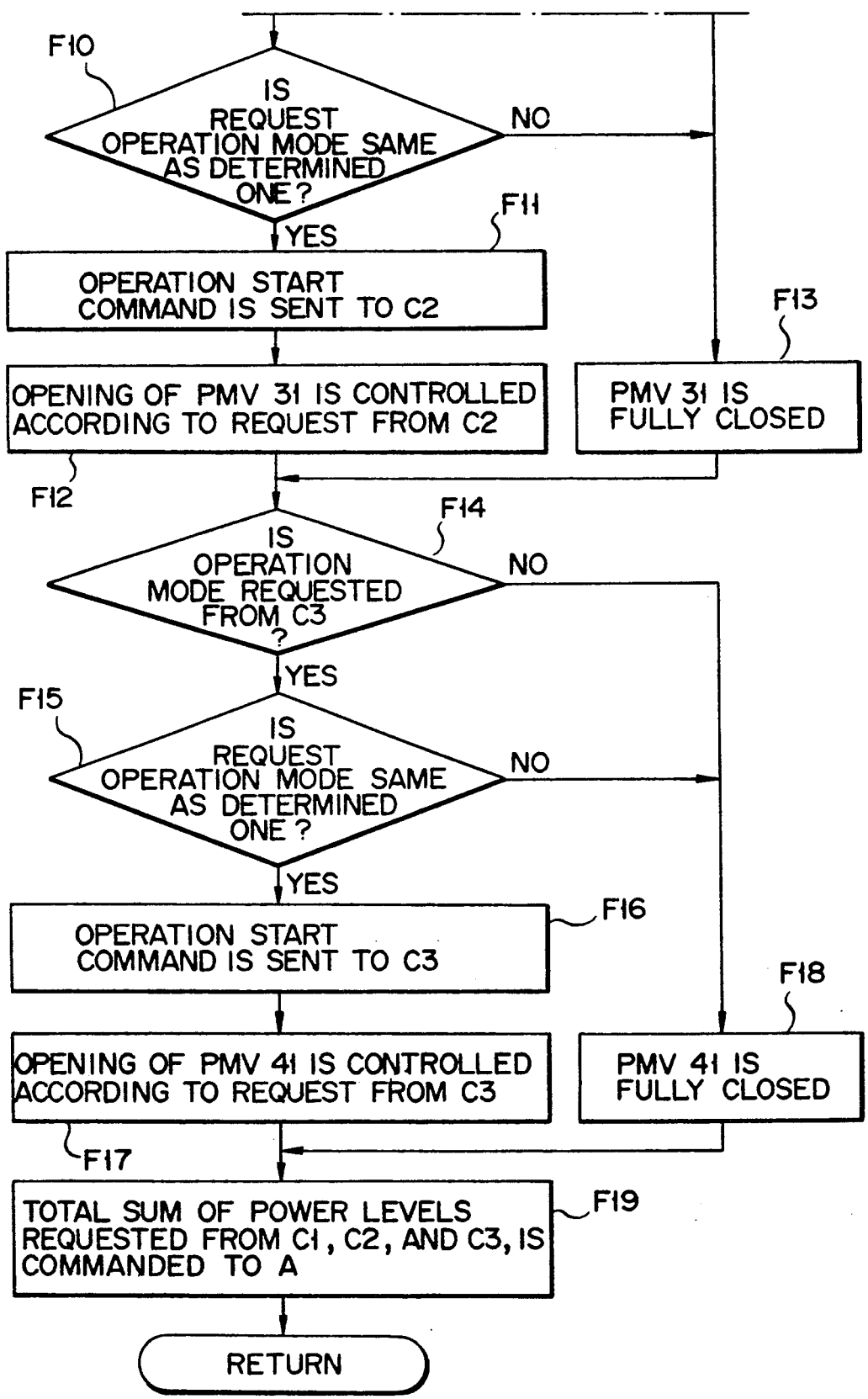
Figure 8A:
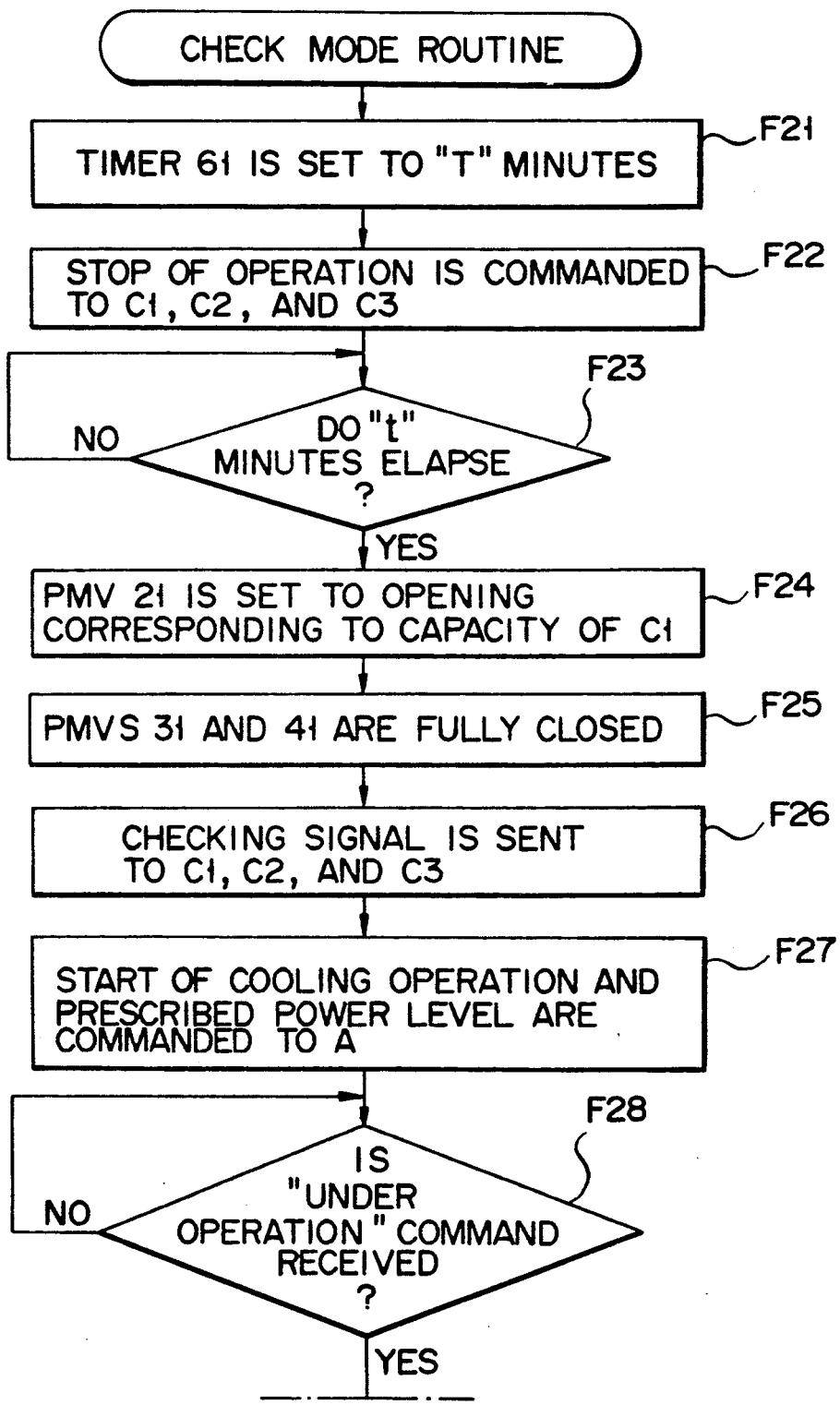
FIGS. 8A, 8B, 8C, and 8D are flow charts showing the check mode routine for the branch unit in the first embodiment.
Figure 8B:
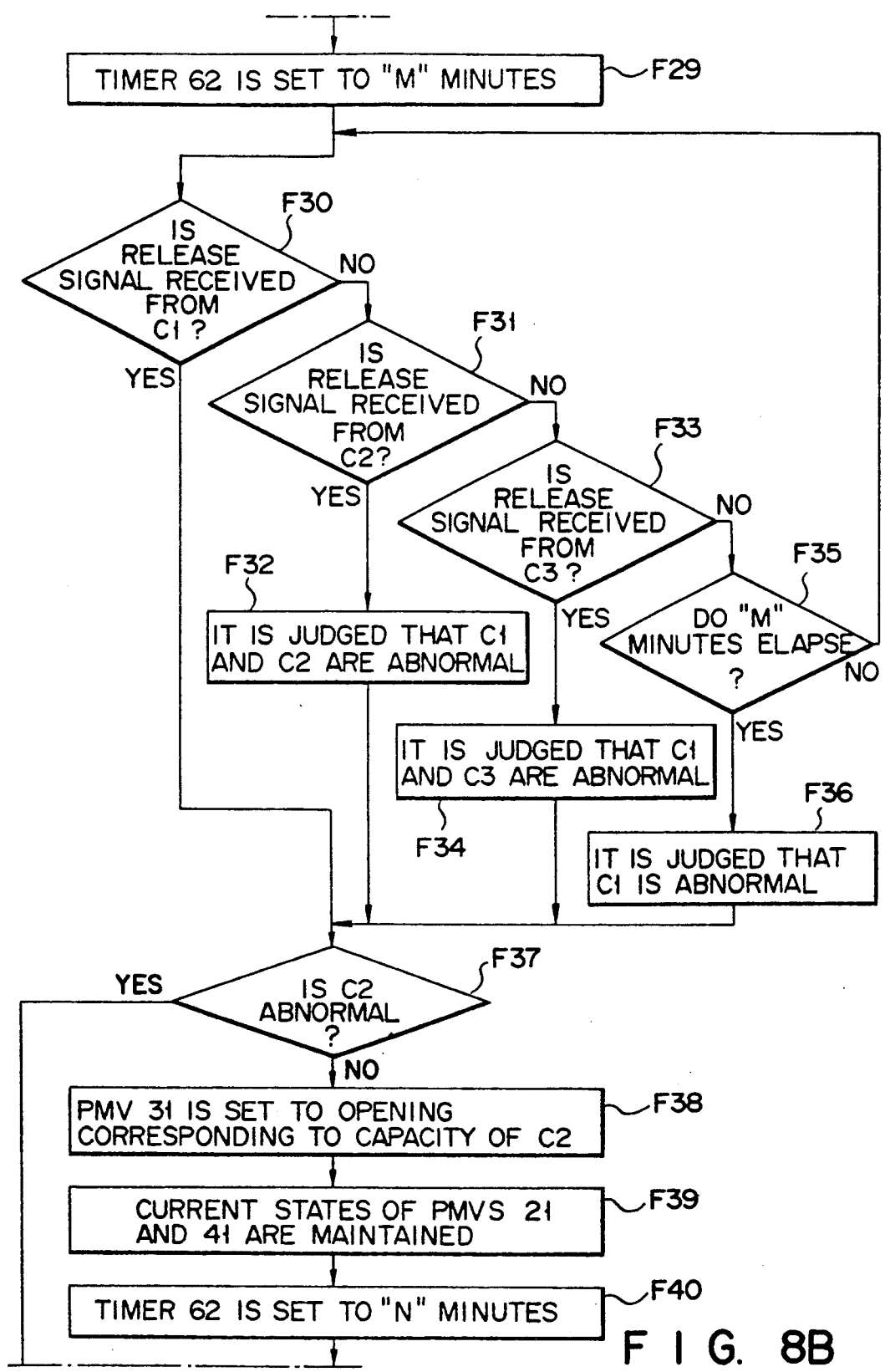
Figure 8C:
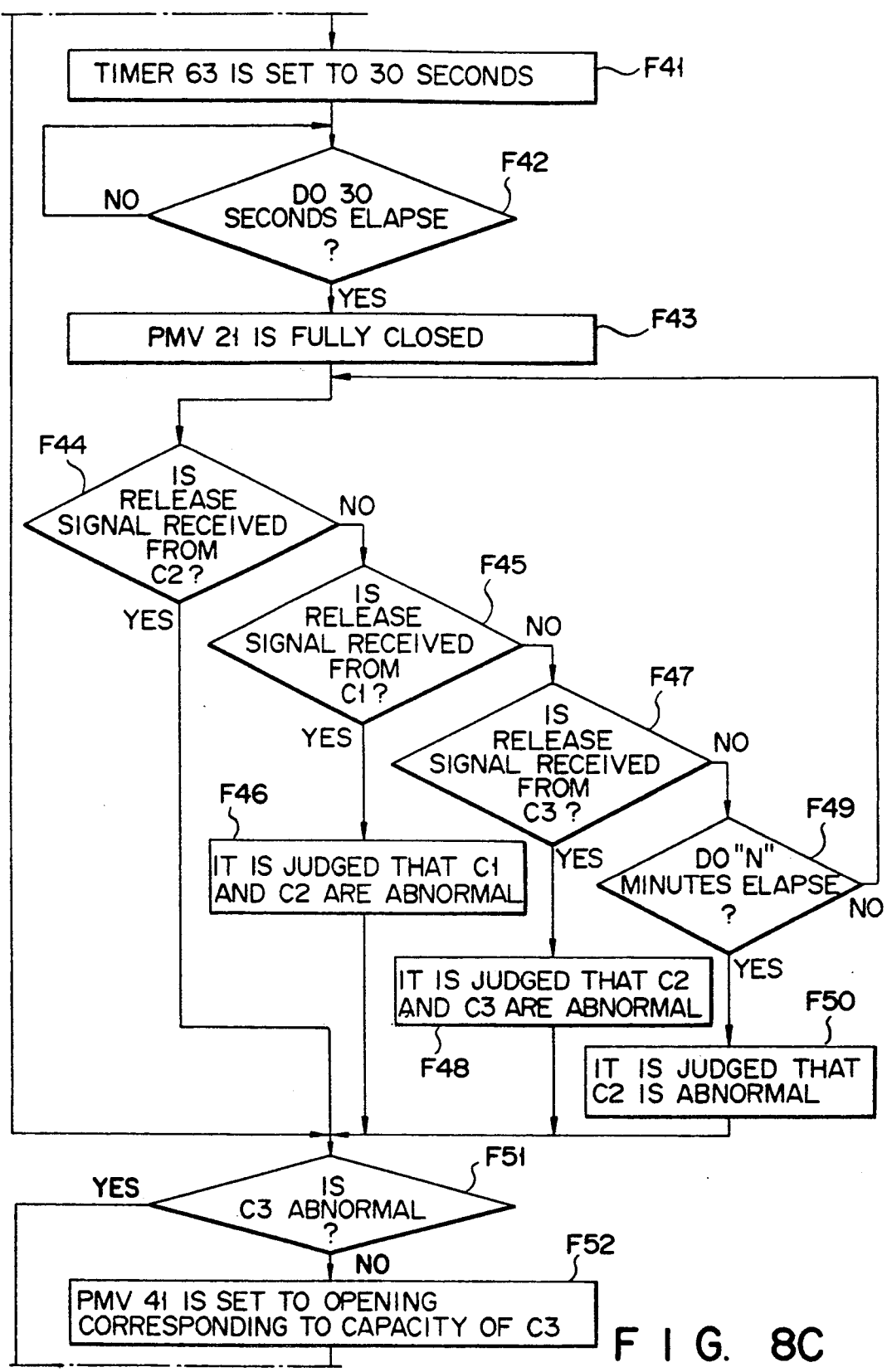
Figure 8D:
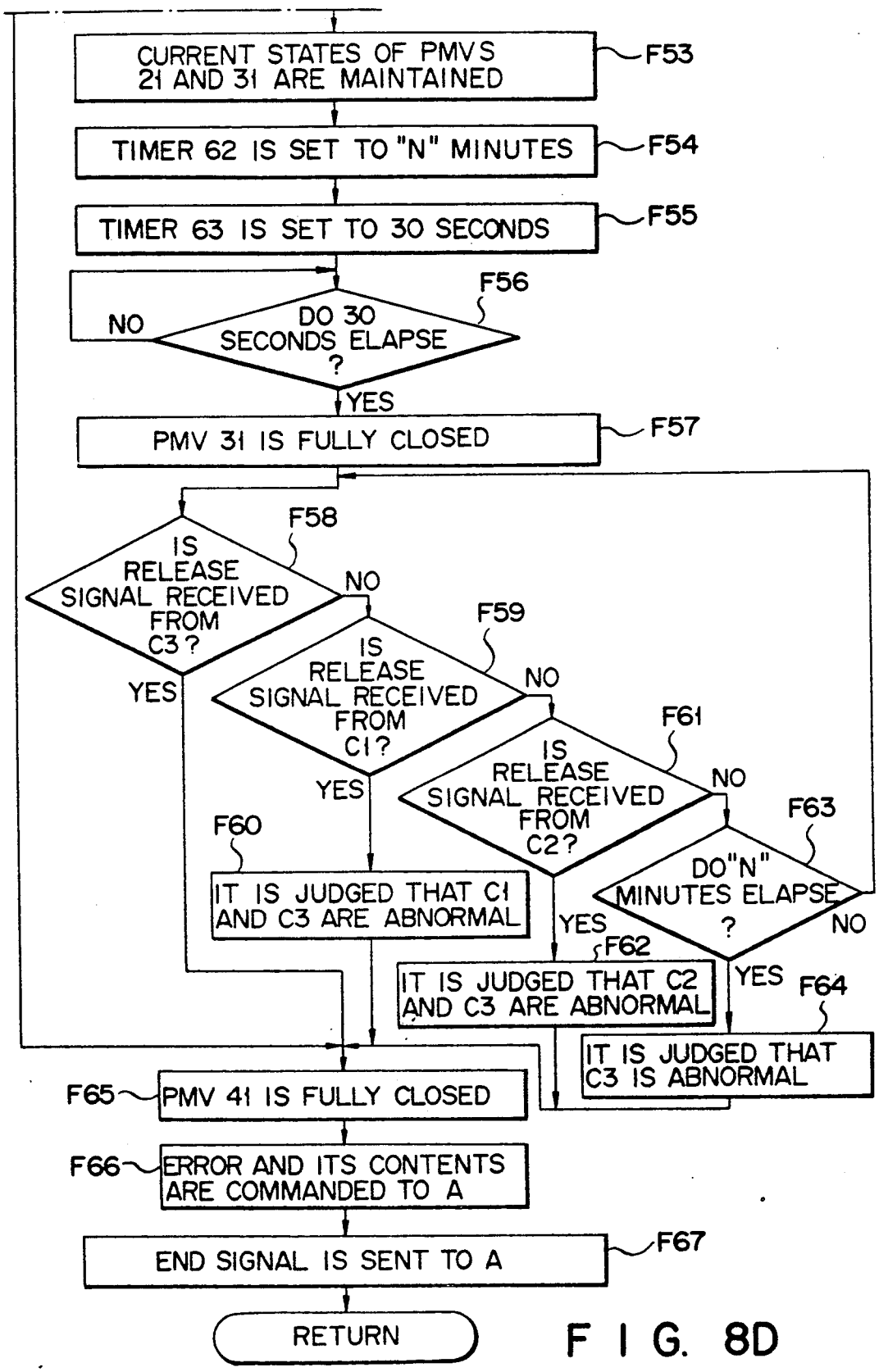

The following is the description of the whole operation and the control by the branch controller 60 according to FIGS. 7A and 7B.

In the branch controller 60, the following control is executed when the checking signal is not received from the outdoor unit A (step F1).

Either the cooling- or heating-operation mode is determined according to the request for the operation mode from the indoor units $C_1$ through $C_3$ (step F2).

For example, if the number of requests for the cooling operation mode is more than that of requests for the heating operation mode, the cooling operation mode is determined. If the number of requests for the heating operation mode is more than that of requests for the cooling operation mode, the heating operation mode is determined. If the number of requests for the cooling operation mode is equal to that of requests for the heating operation mode, the cooling operation mode is preferentially determined.

The determined operation mode is requested to the outdoor unit A (step F3).

It is checked if an operation mode is requested from the indoor unit $C_1$ (step F4).

If so, it is checked if the operation mode is the same as the above-determined operation mode (step F5). If so, the operation start command is sent to the indoor unit $C_1$ (step F6) and the opening of the PMV 21 is controlled according to the power level requested from the indoor unit $C_1$ (step F7).

If an operation mode is not requested from the indoor unit $C_1$ in the step F4 or the operation mode is not the same in the step F5, the PMV 21 is fully closed (step F8).

It is checked if an operation mode is requested from the indoor unit $C_2$ (step F9).

If so, it is checked if the operation mode is the same as the above-determined operation mode (step F10). If so, the operation start command is sent to the indoor unit $C_2$ (step F11) and the opening of the PMV 31 is controlled according to the power level requested by the indoor unit $C_2$ (step F12).

If an operation mode is not requested from the indoor unit $C_2$ in the step F9 or the operation mode is not the same in the step F10, the PMV 31 is fully closed (step F13).

It is checked if an operation mode is requested from the indoor unit $C_3$ (step F14).

If so, it is checked if the operation mode is the same as the above-determined operation mode (step F15). If so, the operation start command is sent to the indoor unit $C_3$ (step F16) and the opening of the PMV 41 is controlled according to the power level requested by the indoor unit $C_3$ (step F17).

If an operation mode is not requested from the indoor unit $C_3$ in the step F14 or the operation mode is not the same in the step F15, the PMV 41 is fully closed (step F18).

The total sum of the power levels requested from the indoor units $C_1$ through $C_3$ is commanded to the out door unit A (step F19).

Therefore, if the cooling operation mode is requested from the indoor units $C_1$ through $C_3$, the cooling operation mode is determined and refrigerant flows in the direction of the arrow shown by a continuous line in FIG. 1.

That is, the refrigerant discharged from the compressors 1 and 2 enters the outdoor heat exchanger 6 through the check valves 3 and 4 and the four-way valve 5. The refrigerant is condensed in the outdoor heat exchanger 6.

The refrigerant through the outdoor heat exchanger 6 passes through the check valve 7, liquid tank 8, header 9, PMVs 21, 31, and 41, and the expansion valves 22, 32, and 42 before entering the indoor heat exchangers 24, 34, and 44 in which the refrigerant is evaporated.

The refrigerant through the indoor heat exchangers 24, 34, and 44 passes through the header 11, four-way valve 5, and the accumulator 12 and is taken in by the compressors 1 and 2.

In the cooling operation mode, the compressor 1 and/or compressor 2 are operated and the operation frequencies are controlled according to the total sum of the cooling power levels requested from the indoor units $C_1$ through $C_3$.

As the total sum of the requested cooling power levels increases, the number of compressors operated changes from 1 to 2. On the contrary, as the total sum of the requested cooling power levels decreases, the number of compressors operated changes from 2 to 1.

At the same time, the quantity of the refrigerant given to the indoor unit $C_1$ is set according to the cooling power level requested from the indoor unit $C_1$ by controlling the opening control of the PMV 21.

The quantity of the refrigerant given to the indoor unit $C_2$ is set according to the cooling power level requested from the indoor unit $C_2$ by controlling the opening of the PMV 31.

The quantity of the refrigerant given to the indoor unit $C_3$ is set according to the cooling power level requested from the indoor unit $C_3$ by controlling the opening of the PMV 41.

The degree of superheat of the refrigerant in the indoor heat exchangers 24, 34, and 44 is respectively kept at a certain value by controlling the flow rate of the expansion valves 22, 32, and 42.

If the heating operation mode is requested from the indoor units $C_1$ through $C_3$, the heating operation mode is determined and refrigerant flows in the direction of the arrow shown by a broken line in FIG. 1.

That is, the refrigerant discharged from the compressors 1 and 2 passe through the check valves 3 and 4, the four-way valve 5, and the header 11 before entering the indoor heat exchangers 24, 34, and 44 in which the refrigerant is condensed.

The refrigerant through the indoor heat exchangers 24, 34, and 44 passes through the check valves 23, 33, and 43, the expansion valves 21, 31, and 41, the header 9, the liquid tank 8, and the expansion valve 10 before entering the outdoor heat exchanger 6 in which the refrigerant is evaporated.

The refrigerant through the outdoor heat exchanger 6 passes through the four-way valve 5 and the accumulator 12 and is taken in by the compressors 1 and 2.

In the heating operation mode the compressor 1 and-/or compressor 2 being operated and the operation frequency of one or both compressors are controlled according to the total sum of the heating power levels requested from the indoor units $C_1$ through $C_3$.

That is, as the total sum of the requested heating power levels increases, the number of compressors operated changes from 1 to 2. On the contrary, as the total sum of the requested heating power levels decreases, the number of compressors operated changes from 2 to 1.

At the same time, the quantity of the refrigerant given to the indoor unit $C_1$ is set according to the heating power level requested from the indoor unit $C_1$ by controlling the opening control of the PMV 21.

The quantity of the refrigerant given to the indoor unit $C_2$ is set according to the heating power level requested from the indoor unit $C_2$ by controlling the opening of the PMV 31.

The quantity of the refrigerant given to the indoor unit $C_3$ is set according to the heating power level requested from the indoor unit $C_3$ by controlling the opening of the PMV 41.

The degree of superheat of the refrigerant in the outdoor heat exchanger 6 is kept at a certain value by controlling the flow rate of the expansion valve 10.

To install the air conditioning apparatus in a building, it is necessary to check if the refrigerant tubes and signal conductors $S_1$ through $S_3$ are normally connected between the outdoor unit A and the indoor units $C_1$ through $C_3$, especially between the branch unit B and the indoor units $C_1$ through $C_3$.

In this case, the checking switch 54 of the outdoor unit A is turned on by the operator.

When the checking switch 54 is turned on, the checking signal is sent from the outdoor unit A to the branch unit B.

When the checking signal is input to the branch controller 60 (step F1), the check mode routine is executed by the branch controller 60 (step F20). FIGS. 8A through 8D show the check mode routine.

In the check mode routine, the timer 61 is set (step F21) and the operation stop command is given to the indoor units $C_1$ through $C_3$ (step F22).

The timer 61 counts a certain time (e.g. "t" minutes) to prevent the compressors 1 and 2 from restarting. This restarting prevention is executed to prevent the service life of the compressors 1 and 2 from being shortened.

When "t" minutes set in the timer 61 elapse (step F23), the PMV 21 is set to the opening corresponding to the capacity of the indoor unit $C_1$ (capacity equivalent to that of the indoor heat exchanger 24) (step F24). The PMVs 31 and 41 are fully closed (step F25).

At the same time, the checking signal is sent from the branch controller 60 to the indoor units $C_1$ through $C_3$ (step F26).

The cooling operation start command is given to the outdoor unit A from the branch controller 60 and the prescribed power level is commanded to it (step F27).

In the outdoor unit A, the compressors 1 and 2 are operated at the prescribed power level according to the command from the branch controller 60 to start the cooling operation. At the same time, the command indicating "under operation" is given to the branch controller 60 from the outdoor unit A.

When the cooling operation is started, refrigerant flows through the indoor heat exchanger 24.

In this case, if the indoor unit $C_1$ is normally connected, the temperature of the indoor heat exchanger 24 decreases to a certain value or lower and the release signal is output from the indoor controller 70. The release signal is sent to the branch controller 60 through the signal conductor $S_1$. In the branch controller 60, reception of the "under operation" command is monitored (step F28).

When the "under operation" command is given to the branch controller 60, the timer 62 is set to "M" minutes (e.g. 10 min). The "M" minutes are the duration required from the time the operation starts to the time the refrigerator condition is stabilized.

At the same time, reception of the release signal from the indoor units $C_1$ through $C_3$ is monitored (steps F30, F31, and F33).

In this case, when the release signal is received from the indoor unit $C_1$, the step F37 starts.

However, if the release signal is received from the indoor unit $C_2$ instead of $C_1$, it is judged that the indoor units $C_1$ and $C_2$ are abnormally connected (step F32) and the step F37 starts.

If the release signal is received from the indoor unit $C_3$ instead of $C_1$, it is judged that the indoor units $C_1$ and $C_3$ are abnormally connected (step F35) and the step F37 starts.

If "M" minutes elapse before the release signal is received from any indoor unit (step F35), it is judged that the indoor unit $C_1$ is abnormally connected (step F36) and the step F37 starts.

In the step F37, it is checked if the indoor unit $C_2$ is judged to be abnormal.

If so, the step F51 starts.

If not, the PMV 31 is set to the opening proportional to the capacity of the indoor unit $C_2$ (capacity equivalent to that of the indoor heat exchanger 24) (step F38).

The current states of the PMVs 21 and 41 are maintained (step F39).

The timer 62 is set to "N" minutes (e.g. 5 min) (step F40).

The "N" minutes are shorter than said "M" minutes. Moreover, the timer 63 is set to 30 sec (step F41). When 30 sec of the timer elapse (step F42), the PMV 21 is fully closed (step F43).

In this case, if the indoor unit $C_2$ is normally connected, refrigerant flows through the indoor heat exchanger 34. Thus, the temperature of the indoor heat exchanger 34 decreases to a certain value or lower and the release signal is output from the indoor controller 80. The release signal is sent to the branch controller 60 through the signal conductor $S_2$.

In the branch controller 60, reception of the release signal from the indoor units $C_1$ through $C_3$ is monitored (steps F44, F45, and F47).

In this case, when the release signal is received from the indoor unit $C_1$, the step F51 starts.

However, if the release signal is received from the indoor unit $C_1$ instead of $C_2$, it is judged that the indoor units $C_1$ and $C_2$ are abnormally connected (step F46) and the step F51 starts.

If the release signal is received from the indoor unit $C_3$ instead of $C_2$, it is judged that the indoor units $C_2$ and $C_3$ are abnormally connected (step F48) and the step F51 starts.

If "N" minutes elapse before the release signal is received from any indoor unit (step F49), it is judged that the indoor unit $C_2$ is abnormally connected (step F50) and the step F51 starts.

In the step F51, it is checked if the indoor unit $C_3$ is judged to be abnormal.

If so, the step F65 starts.

If not, the PVM 31 is set to the opening proportional to the capacity of the indoor unit $C_3$ (capacity equivalent to that of the indoor heat exchanger 34) (step F52).

The current states of the PMVs 21 and 31 are maintained (step F53).

Then, the timer 62 is set to "N" minutes (step F54).

Moreover, the timer 63 is set to 30 sec (step F55).

When 30 sec of the timer elapse (step F56), the PMV 31 is fully closed (step F57).

In this case if the indoor unit $C_3$ is normally connected, refrigerant flows through the indoor heat exchanger 44. Thus, the temperature of the indoor heat exchanger 44 decreases to a certain value or lower and the release signal is output from the indoor controller 90. The release signal is sent to the branch controller 60 through the signal conductor $S_3$.

In the branch controller 60, reception of the release signal from the indoor units $C_1$ through $C_3$ is monitored (steps F58, F59, and F61).

In this case, when the release signal is received from the indoor unit $C_3$, the step F65 starts.

However, if the release signal is received from the indoor unit $C_1$ instead of $C_3$, it is judged that the indoor units $C_1$ and $C_3$ are abnormally connected (step F60) and the step F65 starts.

If the release signal is received from the indoor unit $C_2$ instead of $C_3$, it is judged that the indoor units $C_2$ and $C_3$ are abnormally connected (step F62) and the step F65 starts.

If "N" minutes elapse before the release signal is received from any indoor unit (step F63), it is judged that the indoor unit $C_3$ is abnormally connected (step F64) and the step F65 starts.

In the step 65, the PMV 41 is fully closed.

If any unit is judged to be abnormal, the error contents are commanded by the outdoor unit A (step F66). Then the end signal indicating the end of checking is sent to the outdoor unit A from the branch controller 60 (step F67).

In the outdoor unit A, the error contents are displayed on the indicator 54.

Therefore, it is possible to automatically, quickly, and accurately check if the refrigerant tubes and signal conductors $S_1$ through $S_3$ are normally connected between the outdoor unit A and the indoor units $C_1$ through $C_3$, especially between the branch unit B and the indoor units $C_1$ through $C_3$. Thus, the operator's load is decreased and proper operation is realized after installation.

Especially, because the compressors 1 and 2 are stopped for "t" minutes before checking is started, the following effect is expected. That is, even if normal operation for air conditioning is executed before checking, the operation does not affect the checking.

Moreover, the service life of the refrigeration cycle parts is improved because the checking time for the first indoor unit is set to "M" minutes which are necessary for the refrigeration cycle condition to be stabilized.

Therefore when checking the second indoor unit forward, there is the advantage that the checking time is greatly decreased because it is set to "N" minutes which are necessary for the refrigerator condition to be stabilized.

If the release signal is output from any one of the indoor units $C_1$ through $C_3$ during checking, the refrigerant flow to the indoor units $C_1$ through $C_3$ is forcibly changed regardless of the above "M" and "N" minutes. Therefore, also from this point of view, the checking time is greatly decreased.

The following is the description of the second embodiment of the present invention.

The refrigeration cycle has the same configuration as that of the first embodiment in FIG. 1.

The control circuit superficially has the same configuration as that of the first embodiment in FIG. 2.

Figure 9:
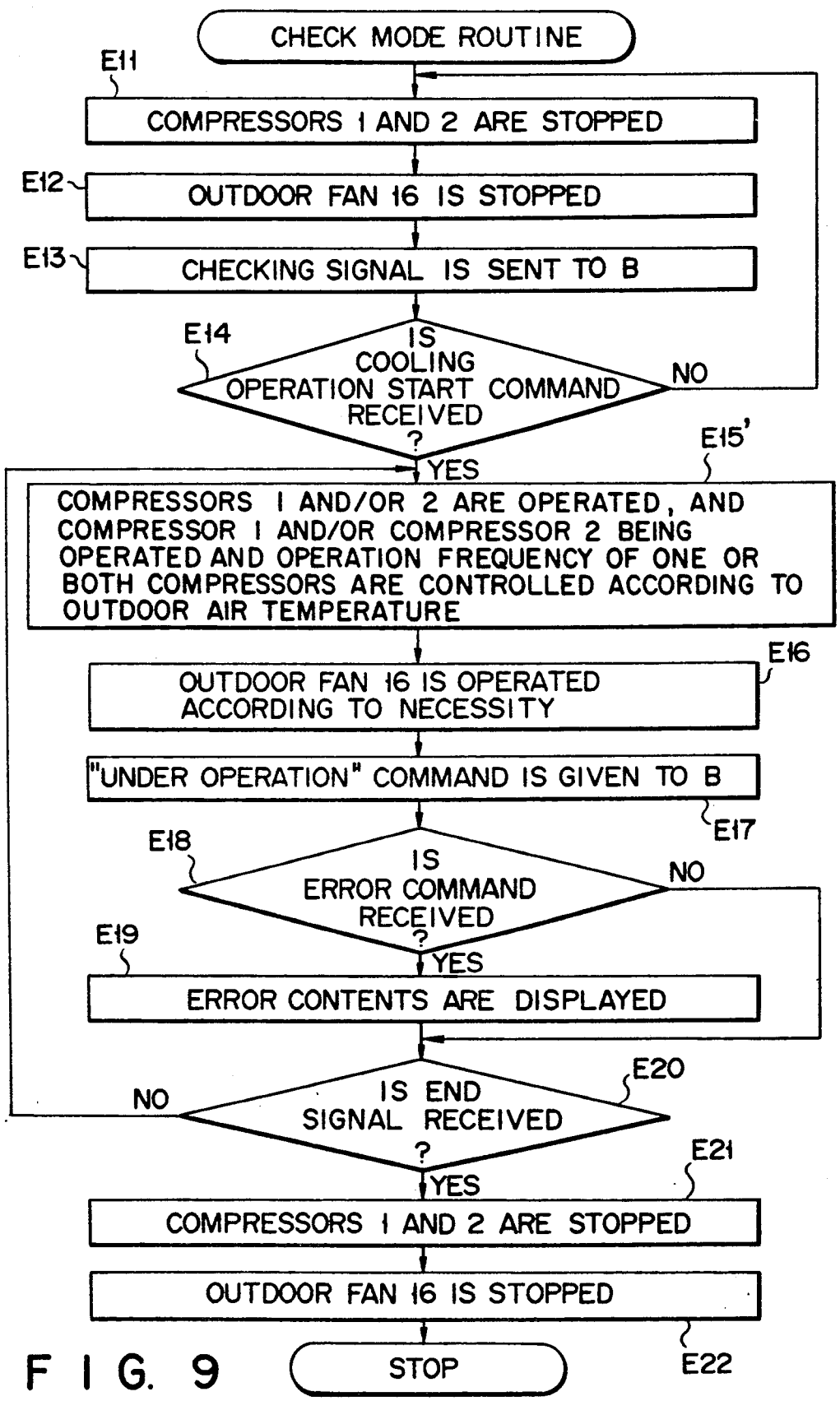
FIG. 9 is a flow chart showing the check mode routine for the outdoor unit in the second embodiment.
Figure 10B:
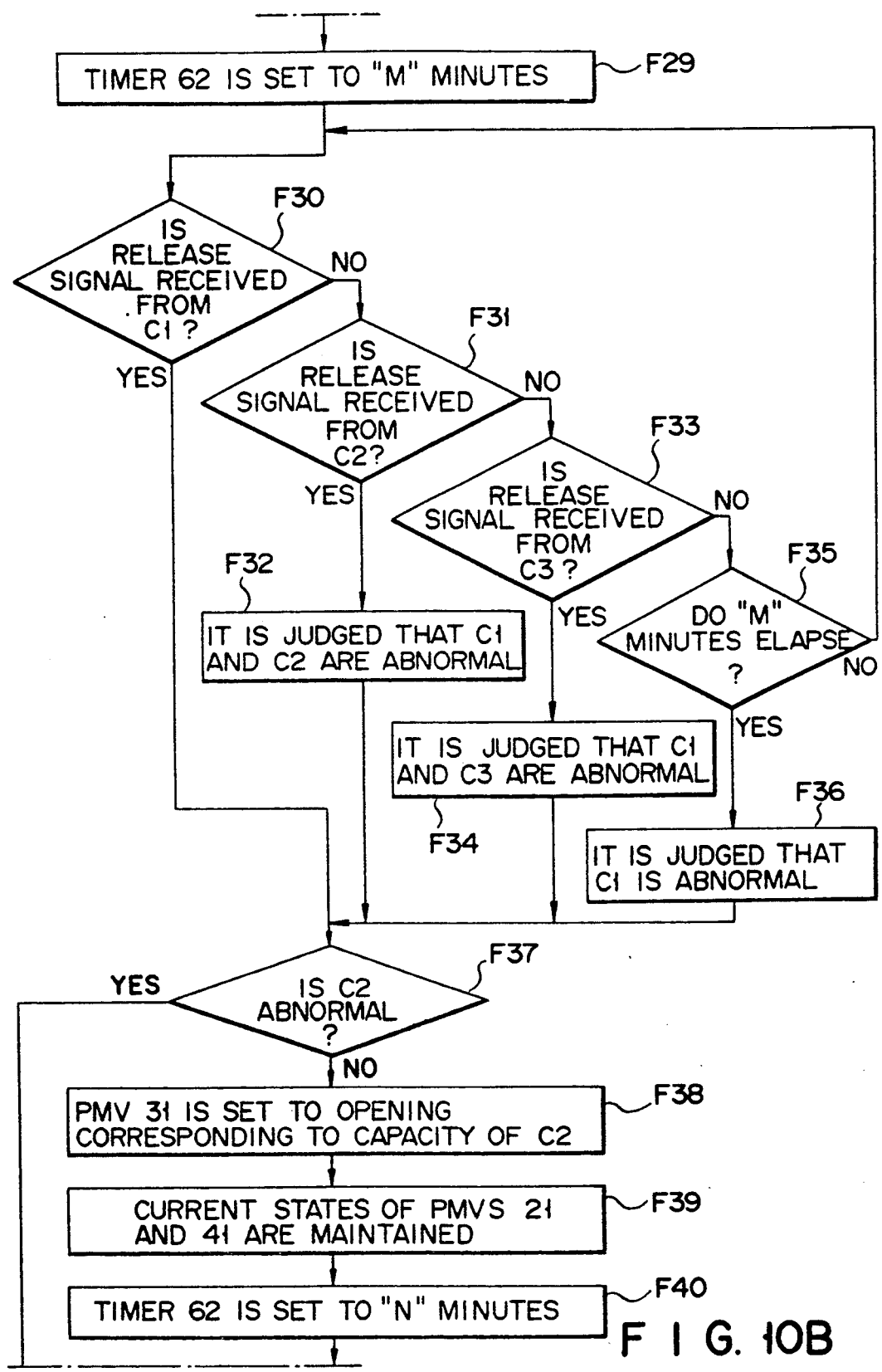
Figure 10C:
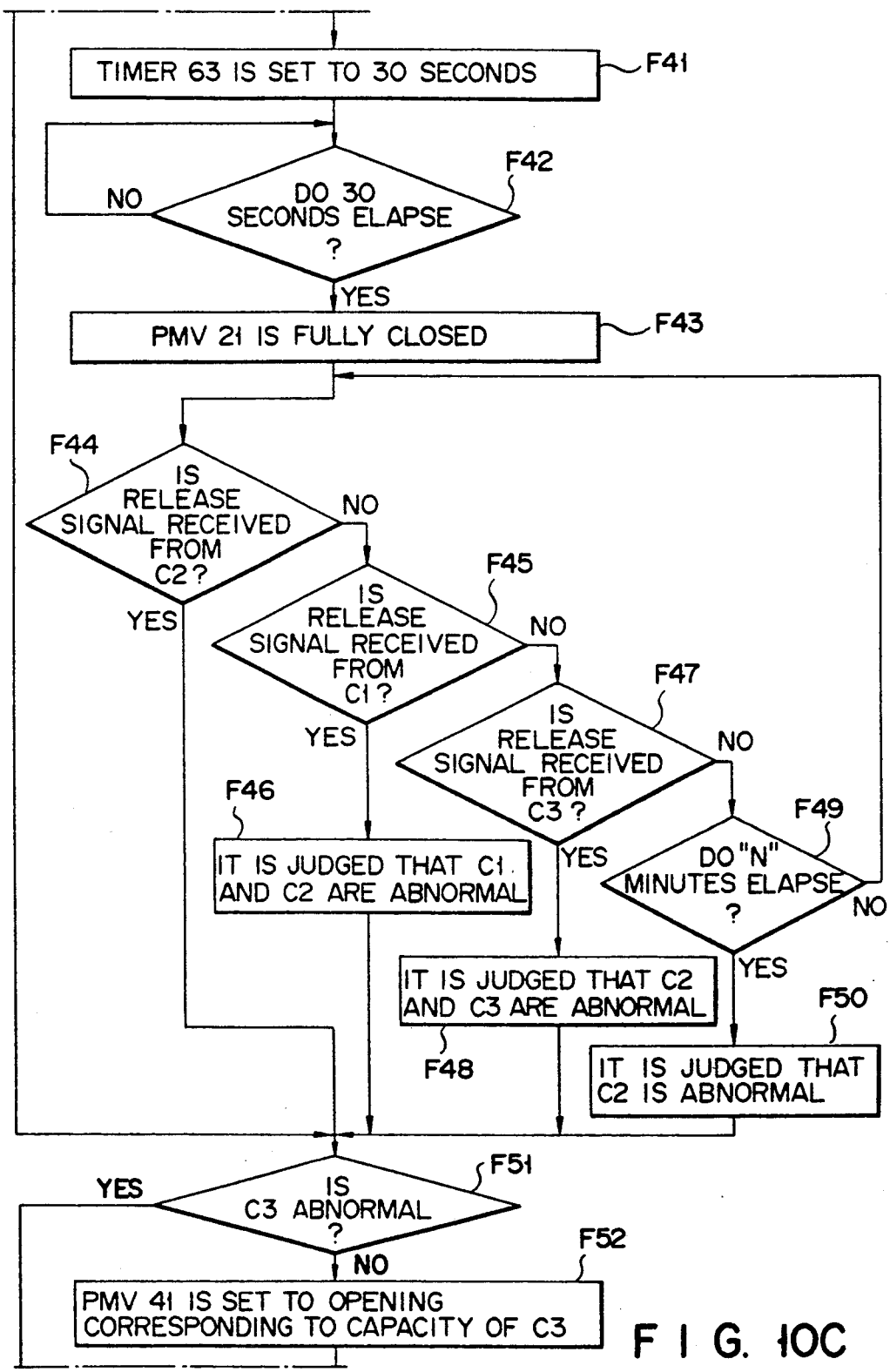
Figure 10D:
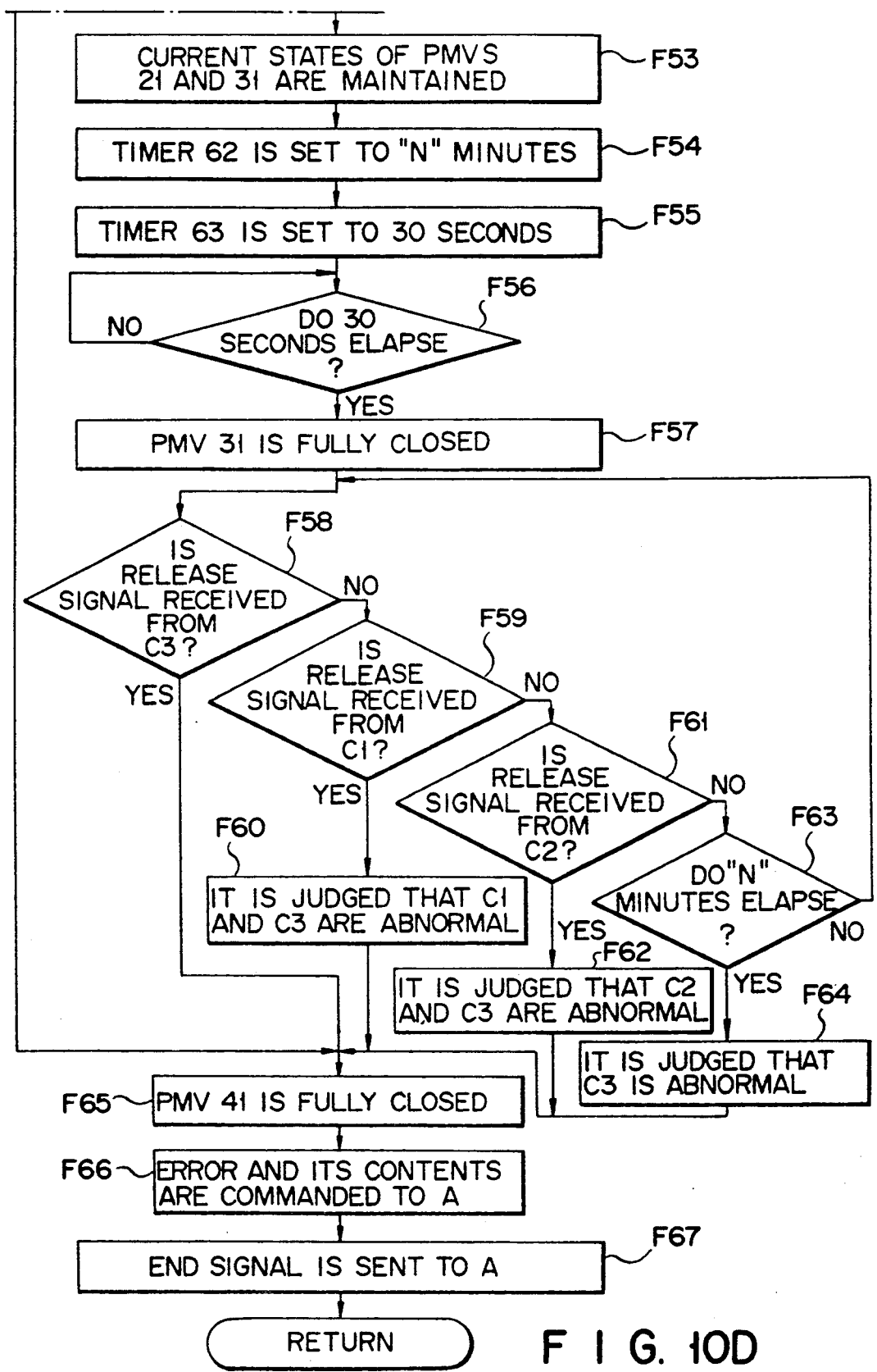

However, the check mode routines of the outdoor controller 50 and the branch controller 60 are different from those of the first embodiment. FIG. 9 shows the check mode routine of the outdoor controller 50 and FIGS. 10A through 10D show the check mode routine of the branch controller 60.

For the control by the outdoor controller 50, the step E15' is included in the check mode routine. Therefore, only the step E15' is different from the step in the check mode routine of the first embodiment.

That is, though the compressor 1 and/or compressor 2 being operated and the operation frequency of one or both compressors are set according to the power level requested from branch unit B in the step E15 of the first embodiment, they are controlled according to the outdoor air temperature detected by the temperature sensor 55 in the step E15' of the second embodiment.

For example, if the outdoor air temperature rises, both the compressors 1 and 2 are operated and a high operation frequency is set to show high power level. If the outdoor air temperature lowers, either compressor 1 or 2 is operated and a low operation frequency is set to show lower power level.

For the control by the branch controller 60, the step F27' is included in the check mode routine. Therefore, only the step F27' is different from the steps in the check mode routine of the first embodiment.

That is, though the start of the cooling operation and the prescribed power level are commanded by the outdoor unit A in the step F27 of the first embodiment, only the start of the cooling operation is commanded by the outdoor unit A in the step F27' of the second embodiment.

Thus, it is possible to prevent the compressors 1 and 2 from being overloaded by controlling the power levels of the compressors 1 and 2 according to the outdoor air temperature for checking. Therefore, there is the advantage that the durability and reliability of the compressors 1 and 2 are improved in addition to the effect of the first embodiment.

Then, the third embodiment of the present invention is described below.

The refrigeration cycle has the same configuration as that of the first embodiment in FIG. 1. The control circuit superficially has the same configuration as that of the first embodiment in FIG. 2.

Figure 11A:
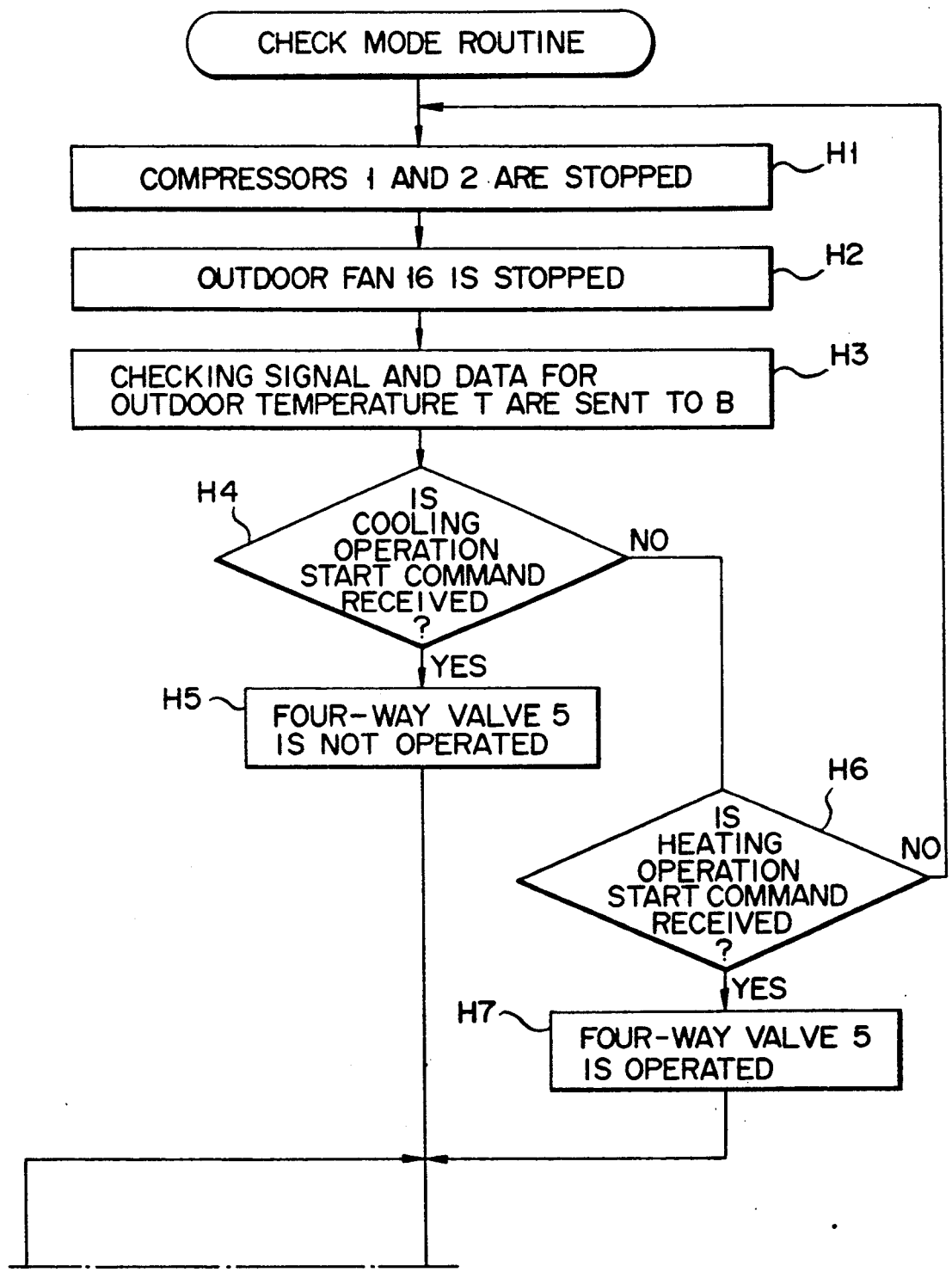
Figure 12A:
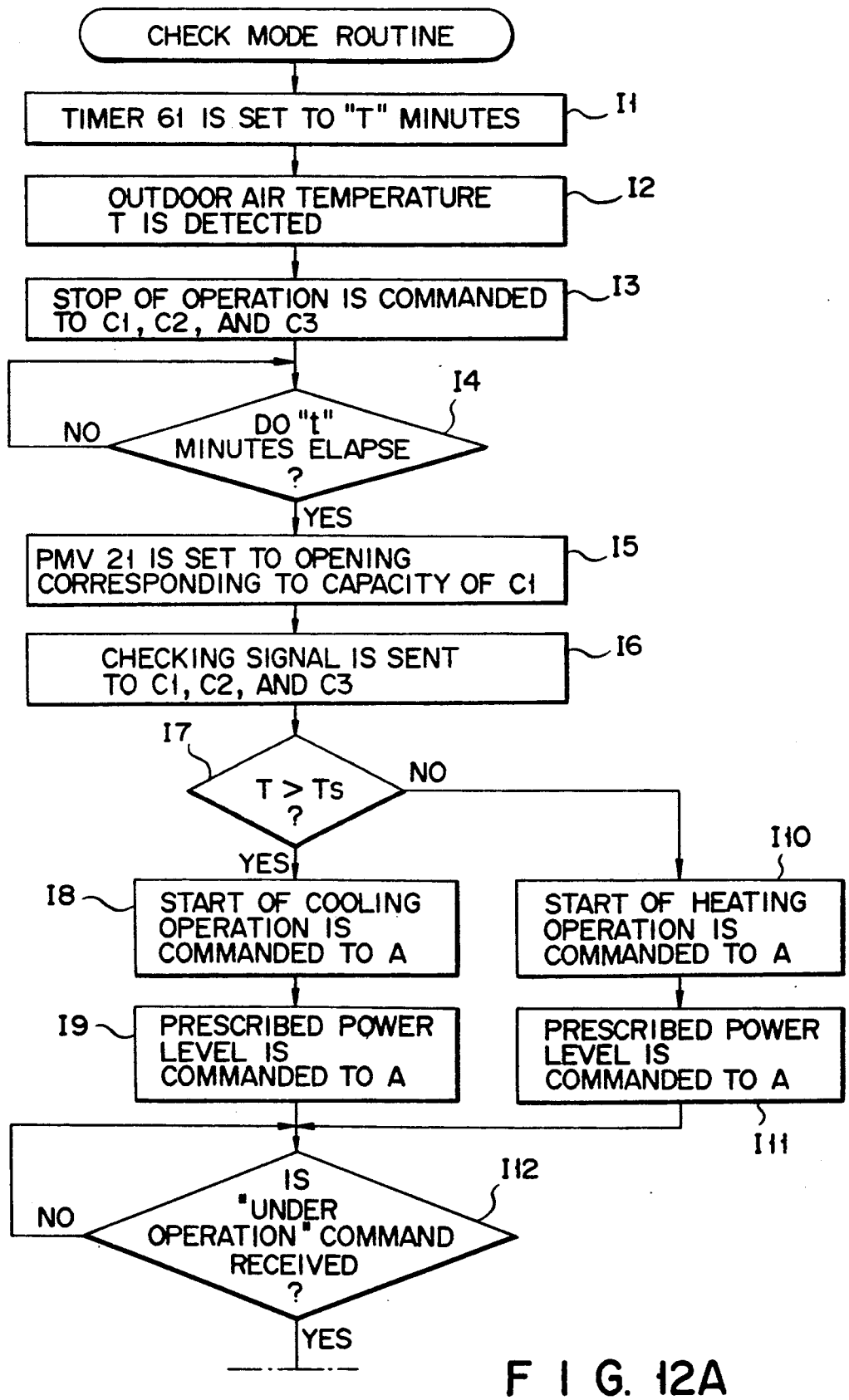
FIGS. 12A, 12B, 12C, and 12D are flow charts showing the check mode routine for the branch unit in the third embodiment.
Figure 12B:
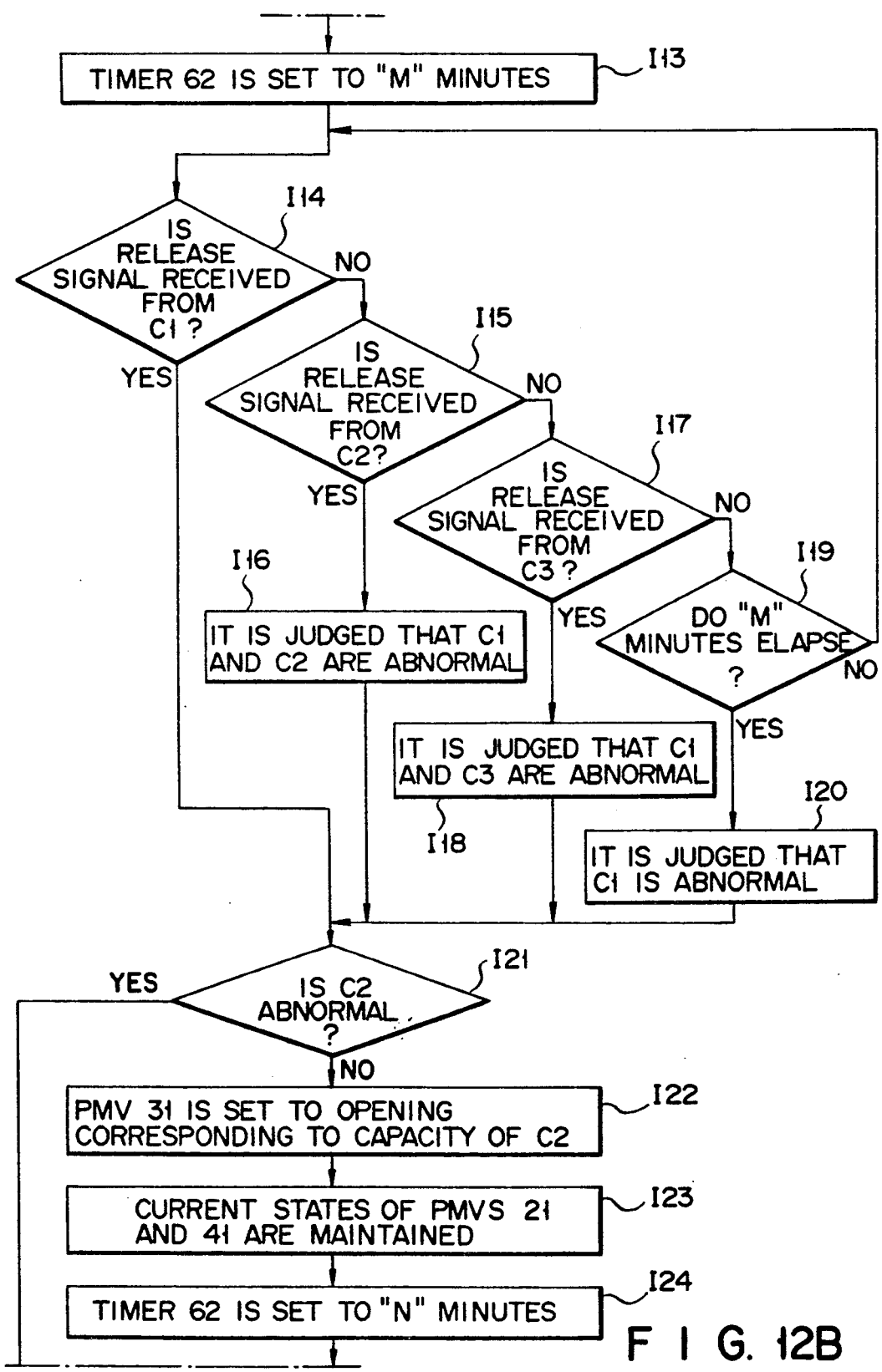
Figure 12C:
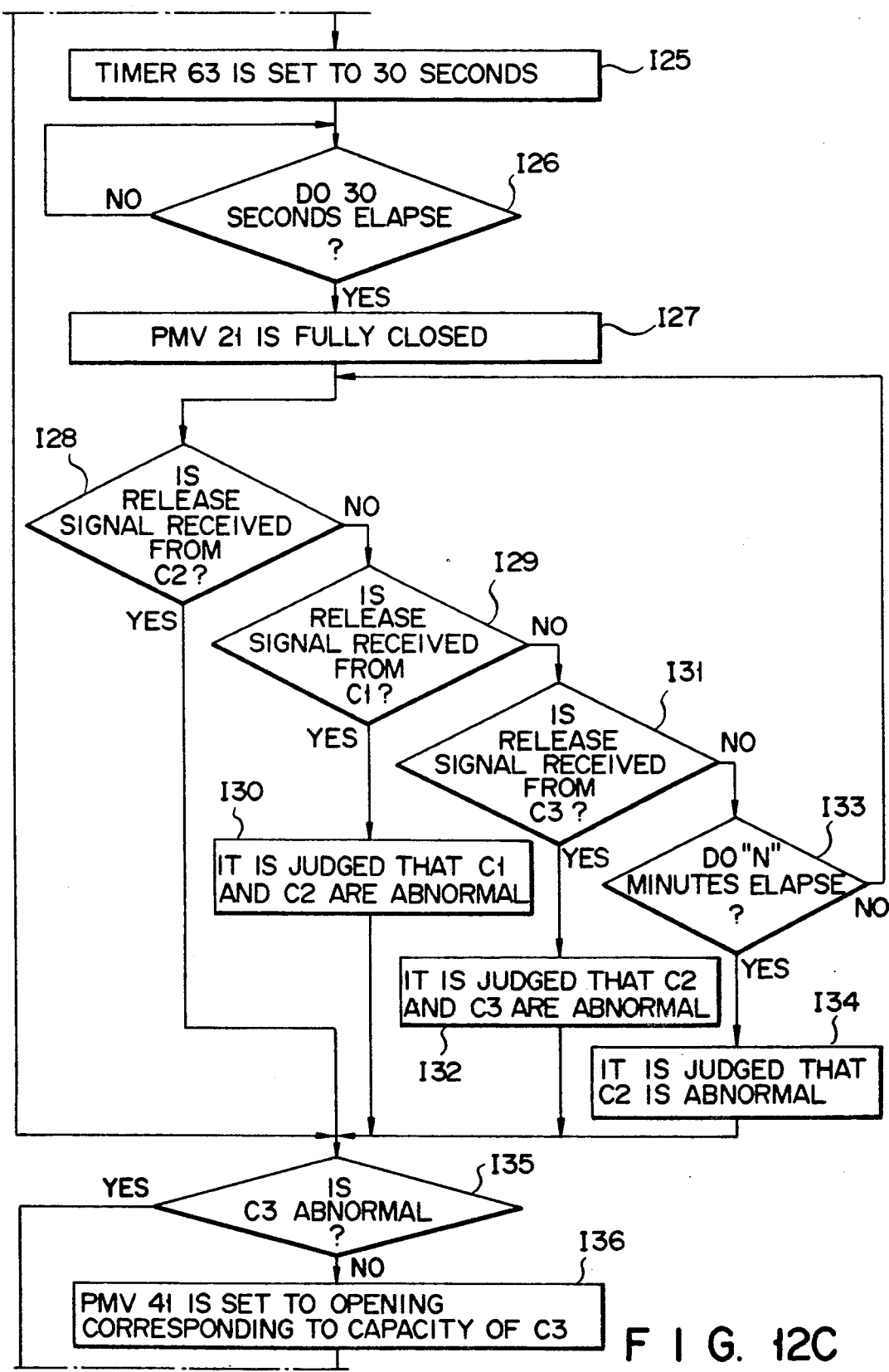
Figure 12D:
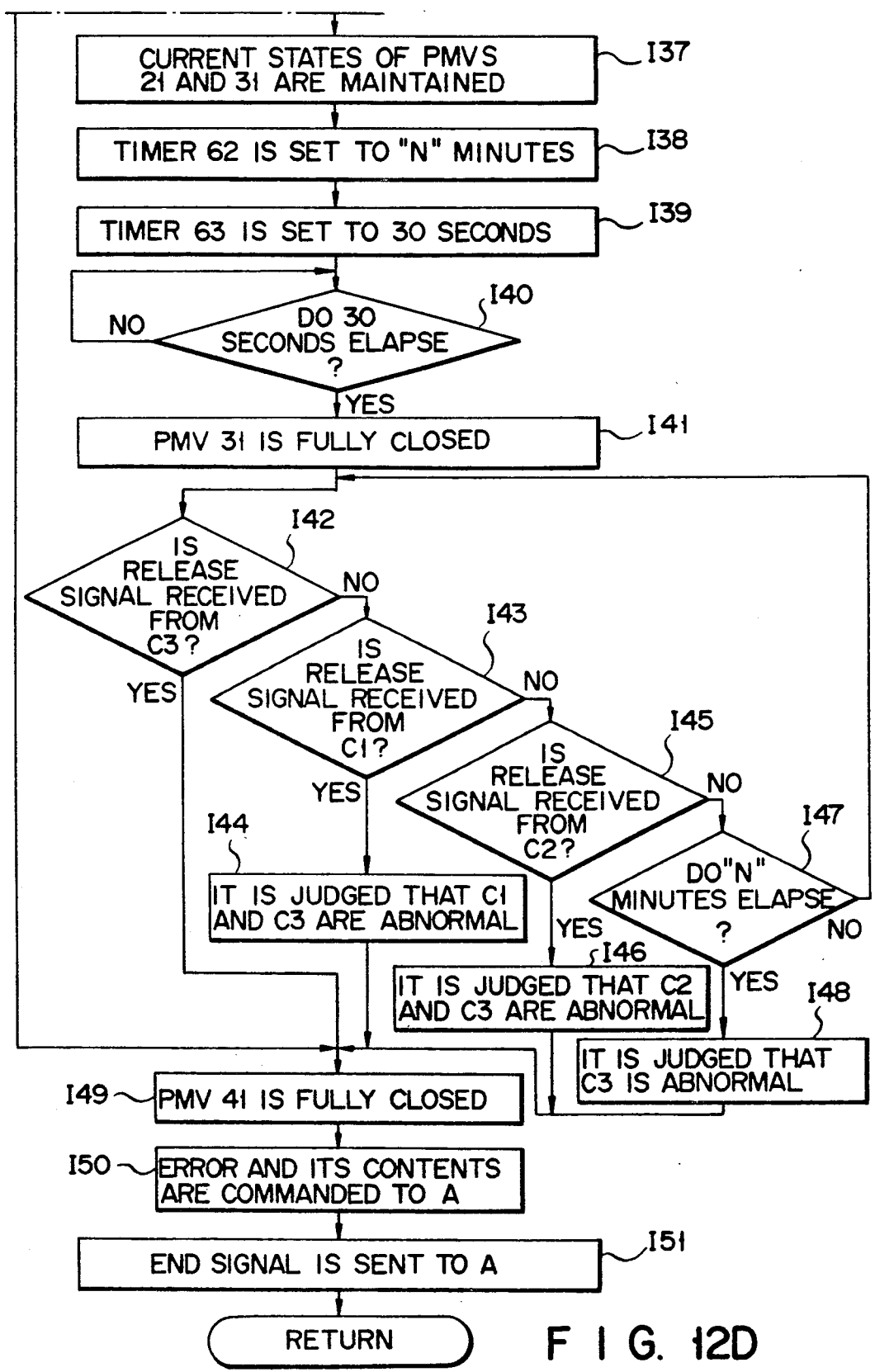
Figure 13A:
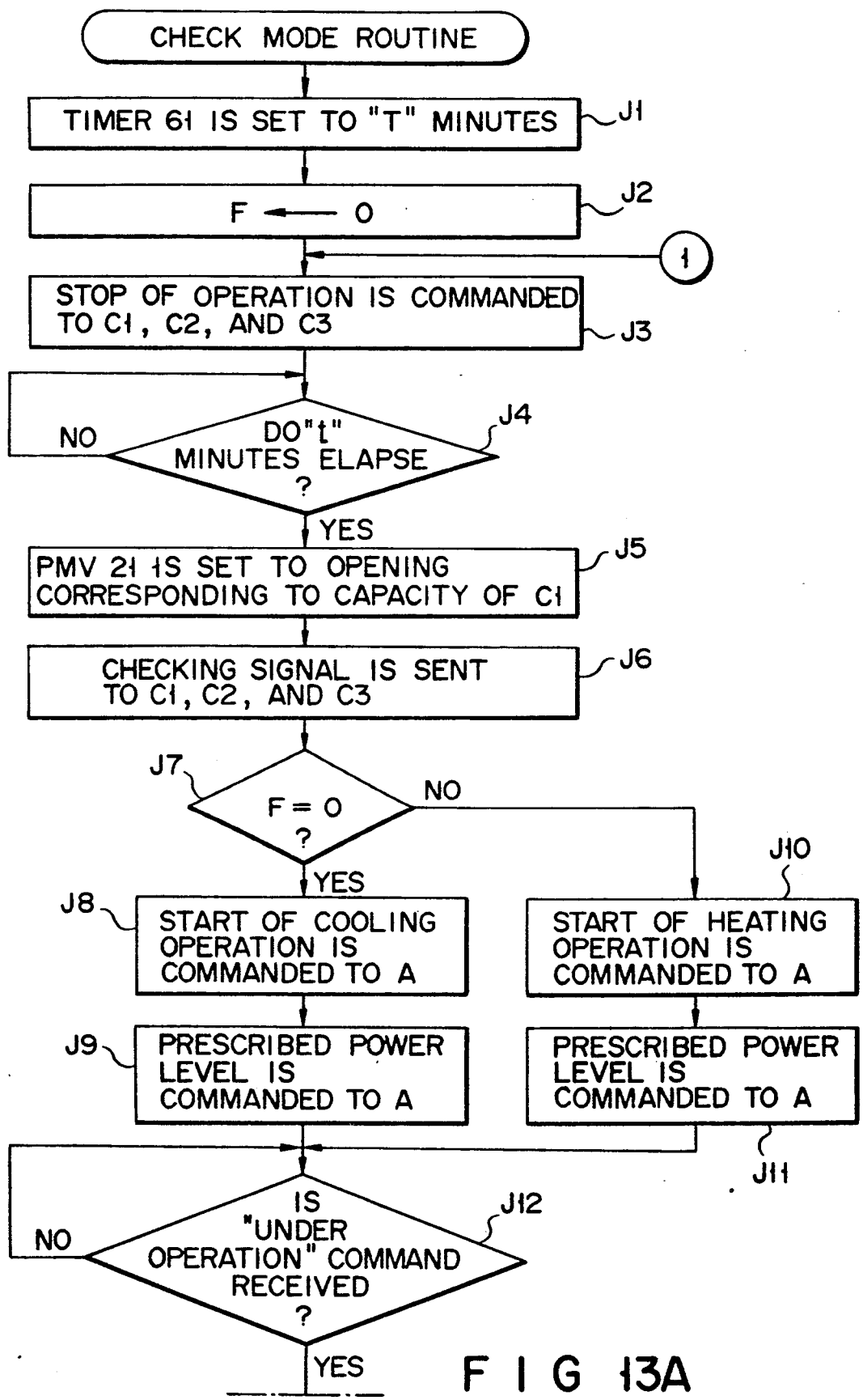
FIGS. 13A, 13B, 13C, 13D, and 13E are flow charts showing the check mode routine for the branch unit in the fourth embodiment.
Figure 13B:
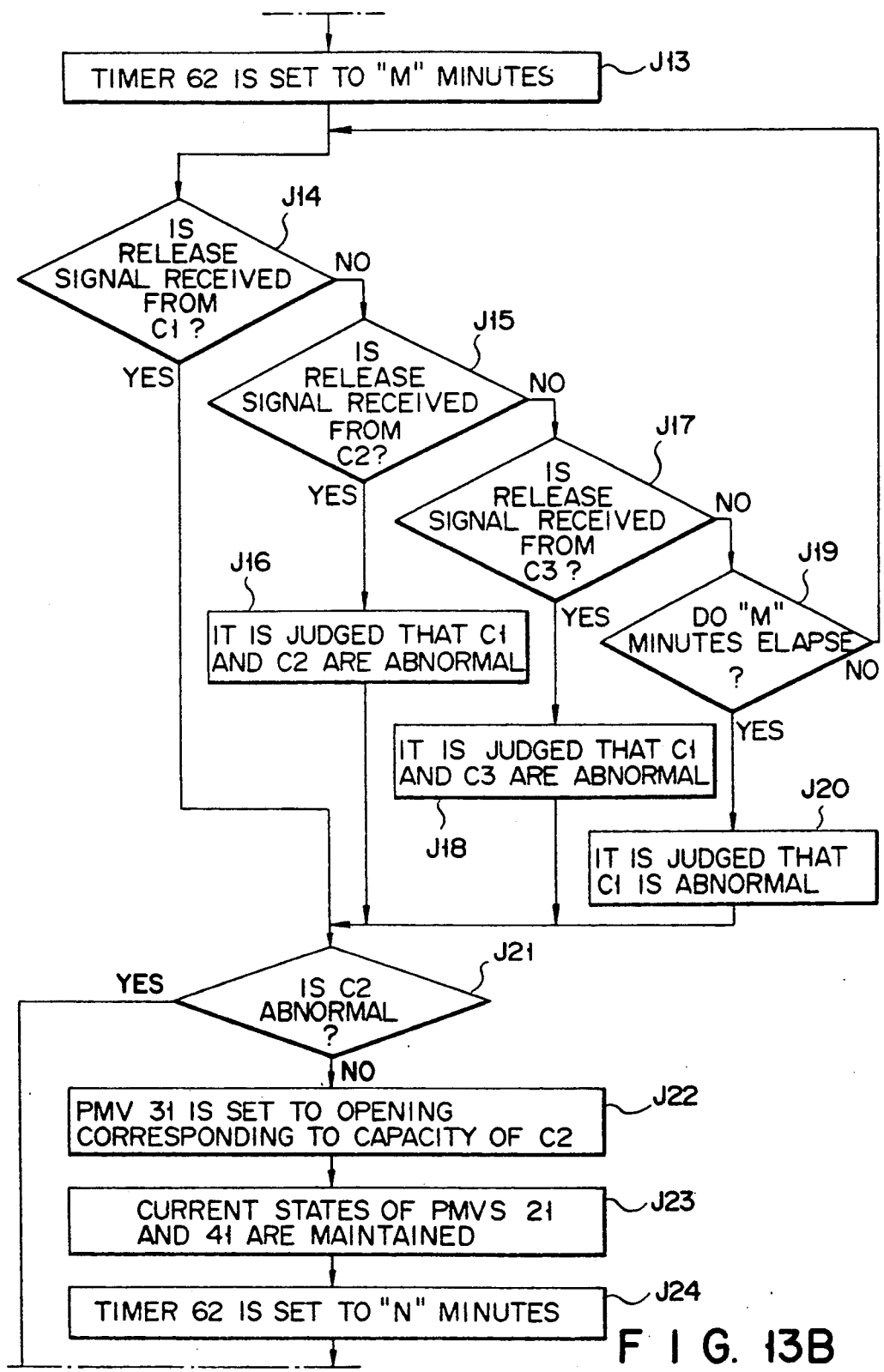
Figure 13C:
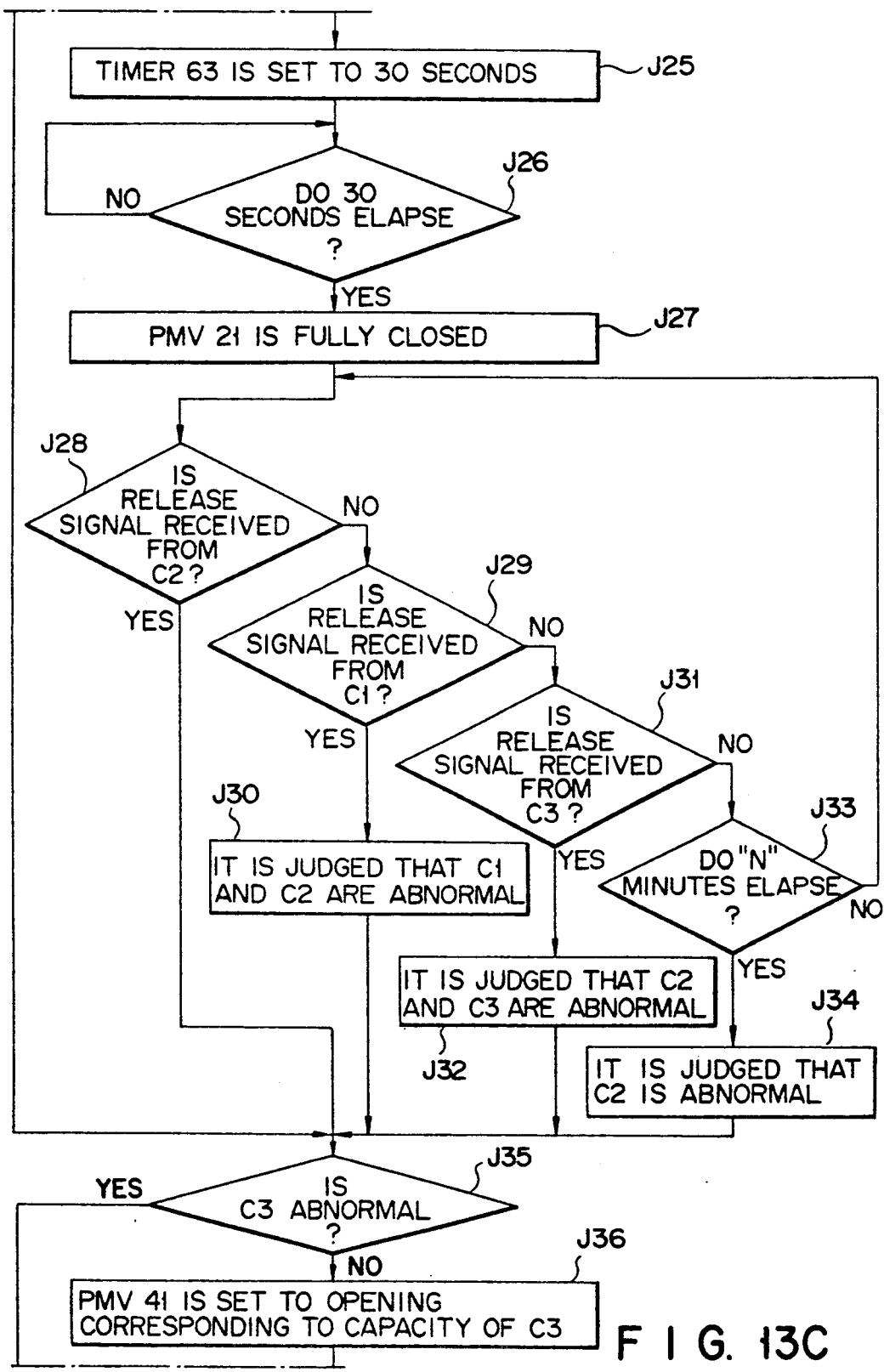
Figure 13D:
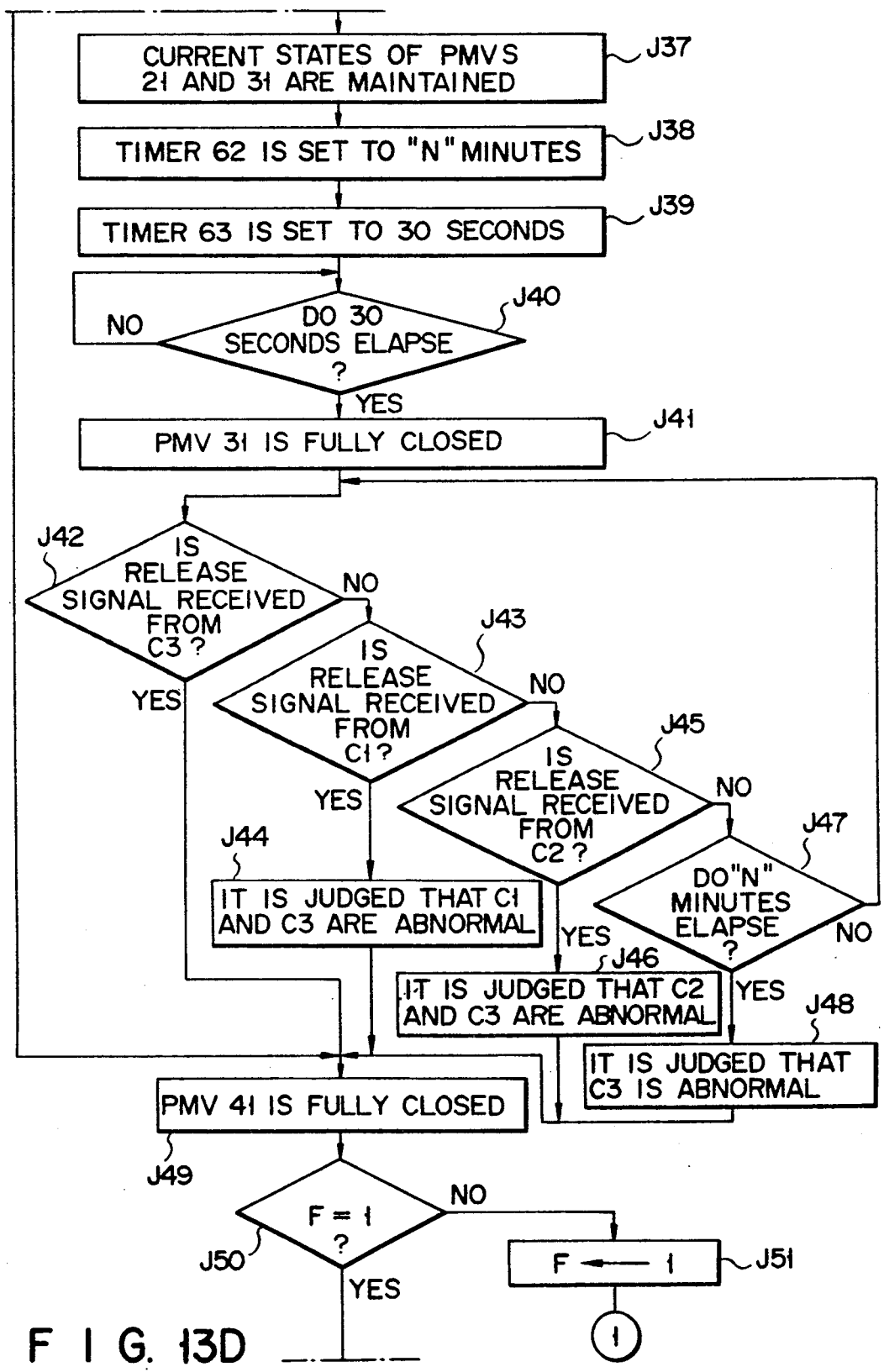
Figure 13E:
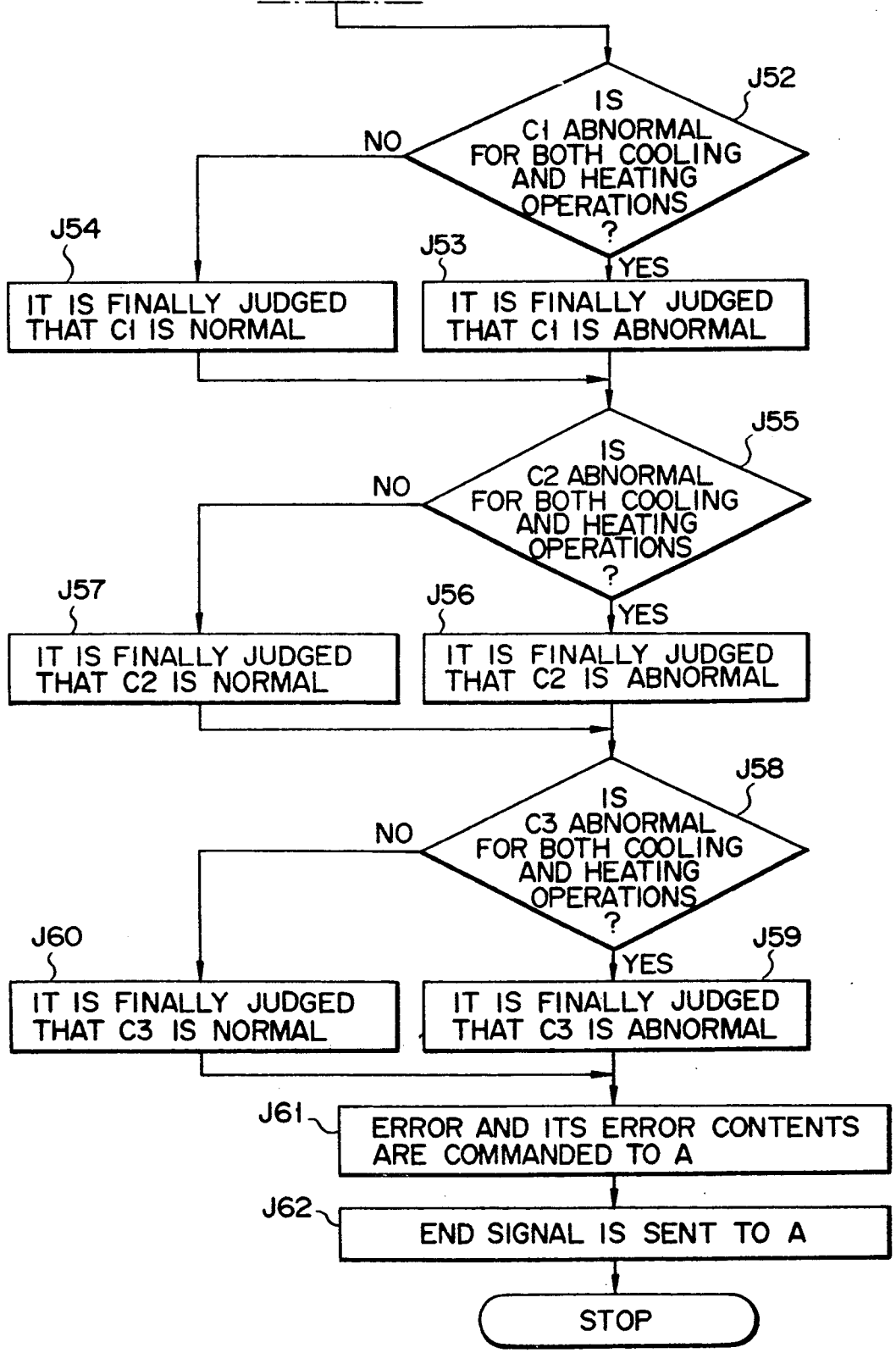
Figure 14A:
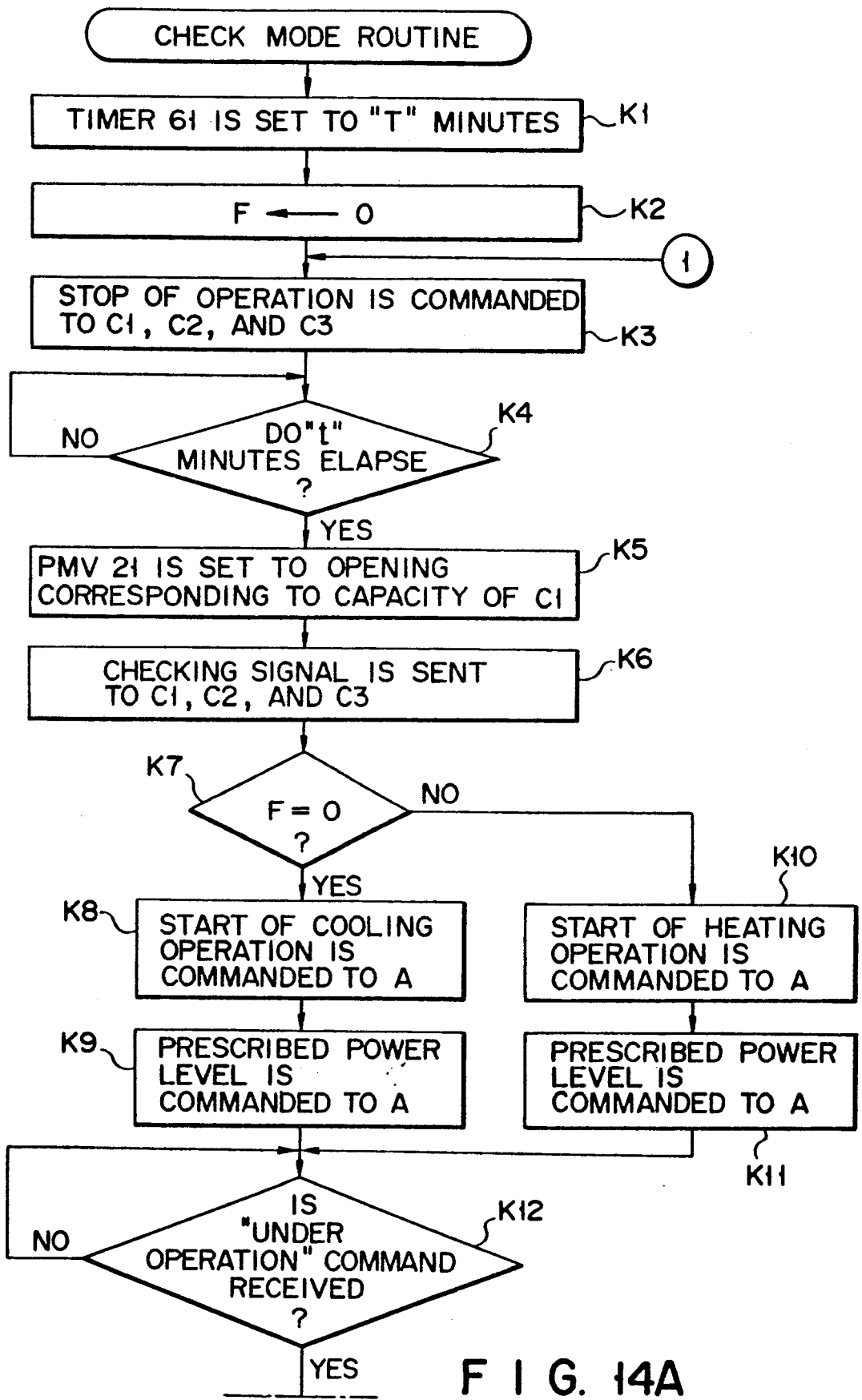
FIGS. 14A, 14B, 14C, 14D, and 14E are flow charts showing the check mode routine for the branch unit in the fifth embodiment.
Figure 14B:
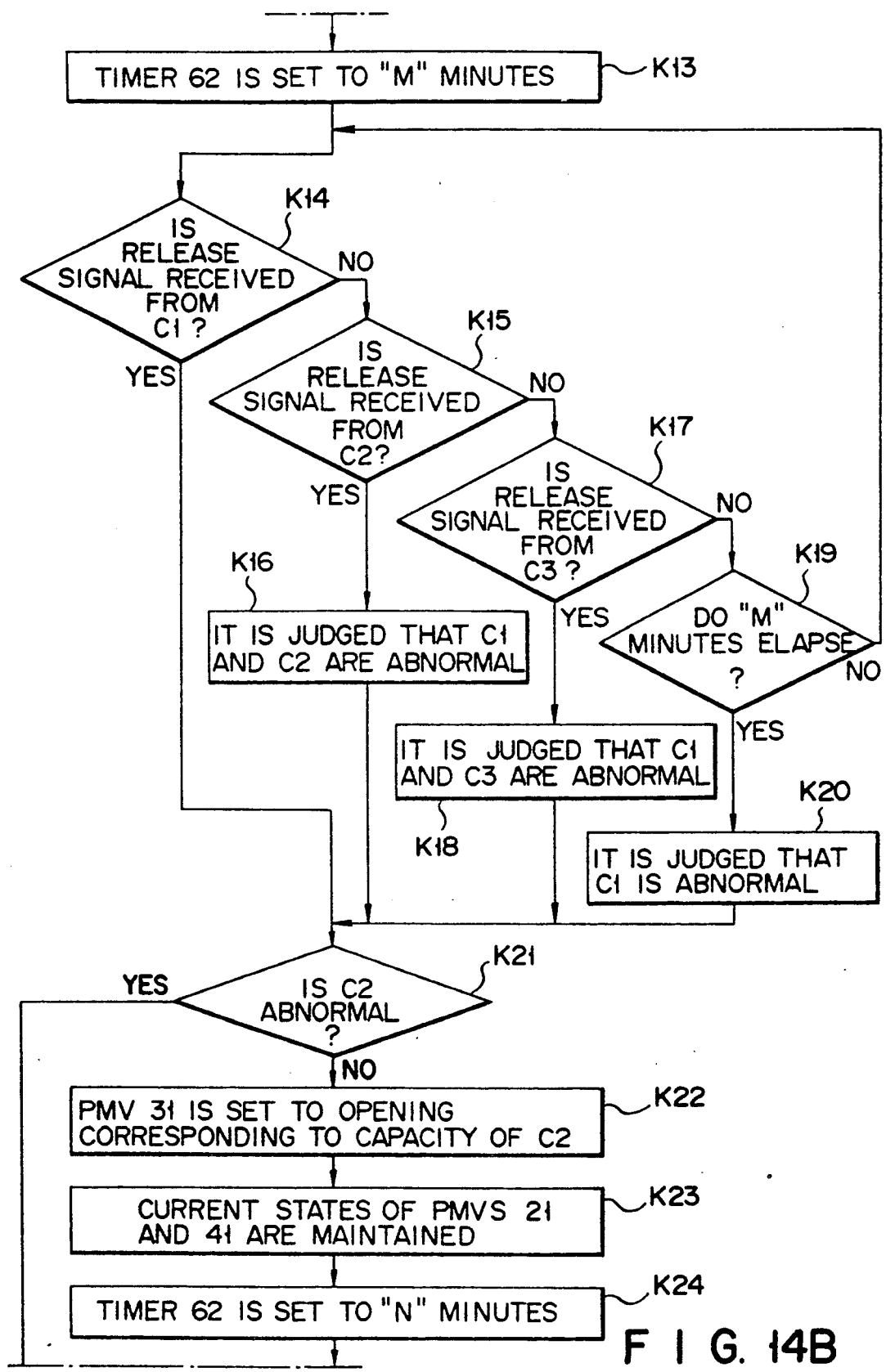
Figure 14C:
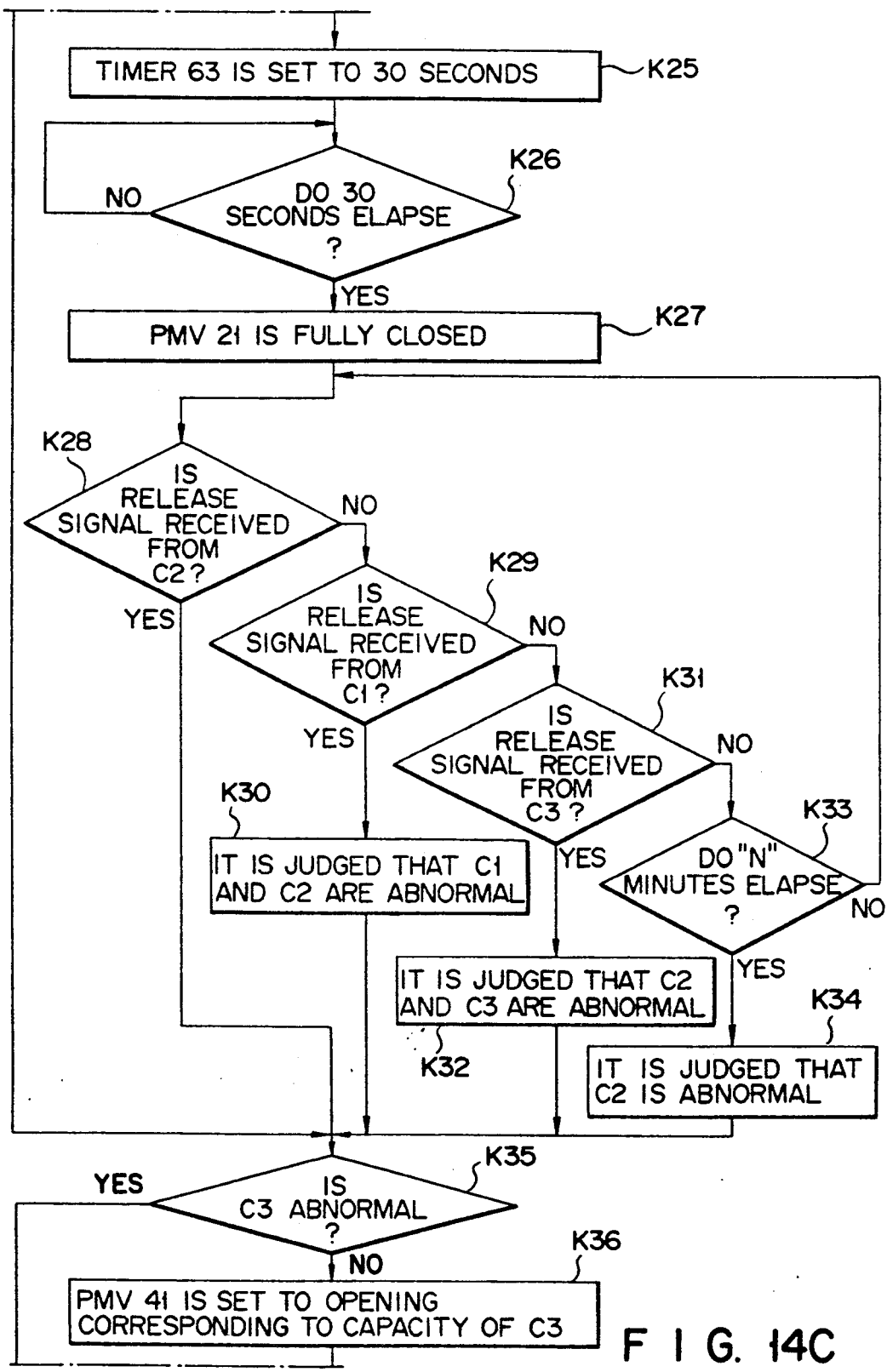
Figure 14D:
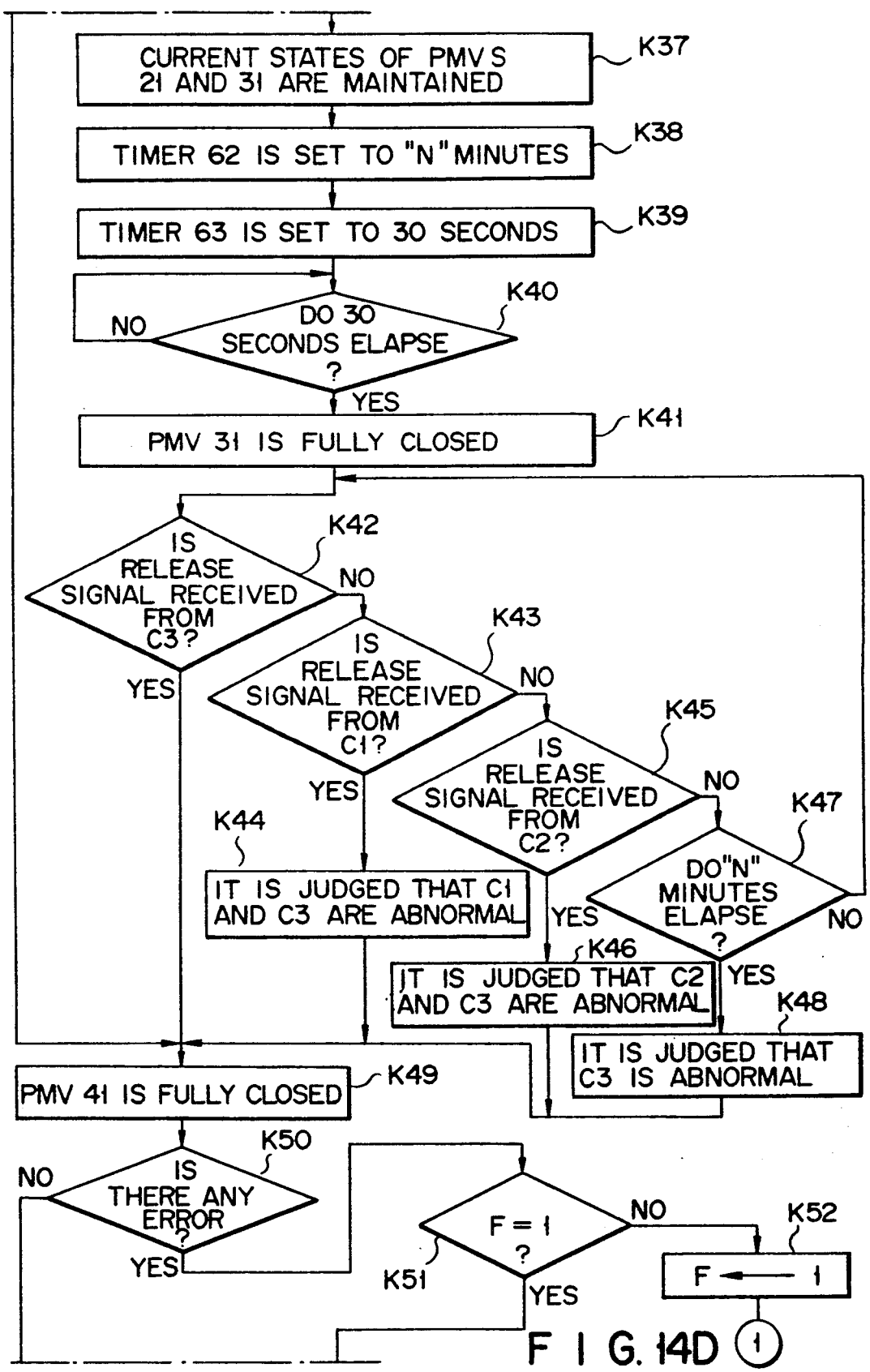
Figure 14E:
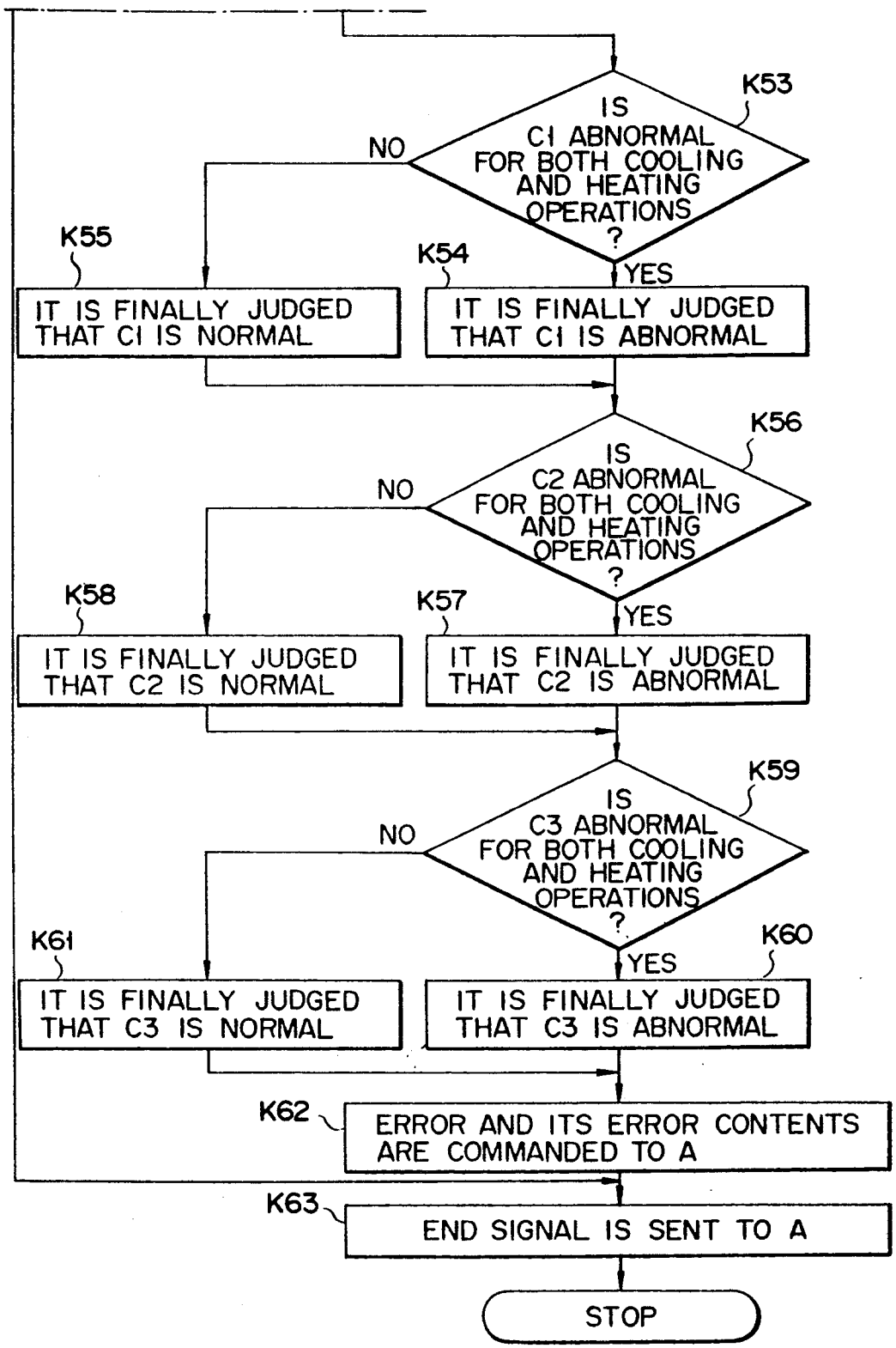

However, the check mode routines of the outdoor controller 50 and the branch controller 60 are different from those in the first embodiment. FIGS. 11A and 11B shows the check mode routine of the outdoor controller 50. FIGS. 12A through 12D shows the check mode routine of the branch controller 60.

The check mode routine of the outdoor controller 50 is described according to FIGS. 11A and 11B.

In the check mode routine, the compressors 1 and 2 are stopped (step H1) and the outdoor fan 16 is stopped (step H2). At the same time, the checking signal and data for the outdoor air temperature T detected by the temperature sensor 55 are sent to the branch unit B (step H3).

When the cooling operation start command is given from the branch unit B (step H4), the four-way valve 5 is not operated (step H5) and the step H8 starts.

When the heating operation start command is given from the branch unit B (step H6), the four-way valve 5 is not operated (step H7) and the step H8 starts.

In the step H8, the compressors 1 and/or 2 are operated. Also, the compressor 1 and/or compressor 2 being operated and the operation frequency of one or both compressors are controlled according to the power level requested from the branch unit B.

At the same time, the outdoor fan 16 is operated according to necessity (step H9).

When the operation is started, the "under operation" command is given to the branch unit B (step H10).

When the error command is given from the branch unit B (step H11), the error contents to be commanded from the branch unit B are displayed on the indicator 54 (step H12).

When the end signal is given from the branch unit B (step H13), the compressors 1 and 2 are stopped (step H14) and the outdoor fan 16 is stopped (step H15). At the same time, the four-way valve 5 is stopped (step H16).

The check mode routine of the branch controller 60 is described below according to FIGS. 12A through 12D.

In the check mode routine, the timer 61 is set (step I21), the outdoor air temperature T is detected according to the data sent from the outdoor unit A (step I2), and the operation stop command is given to the indoor units $C_1$ through $C_3$ (step I3).

When "t" minutes set in the timer 61 elapse (step I4), the PMV 21 is set to the opening corresponding to the capacity of the indoor unit $C_1$ (capacity equivalent to that of the indoor heat exchanger 24). The PMVs 31 and 41 are fully closed.

At the same time, the checking signal is sent from the branch controller 60 to the indoor units $C_1$ through $C_3$ (step I6).

The outdoor air temperature T is compared with the previously-set value Ts (step I7).

If a temperature T is higher than the set value Ts, the cooling operation start command is given from the branch controller 60 to the outdoor unit A (step I8) and the prescribed power level is commanded (step I9).

In this case, in the outdoor unit A, the compressors 1 and 2 are operated at the prescribed power level according to the command from the branch controller 60 and the cooling operation is started. At the same time, the "under operation" command is given from the outdoor unit A to the branch controller 60.

When the cooling operation is started, refrigerant flows through the indoor heat exchanger 24.

In this case, if the indoor unit $C_1$ is normally connected, the temperature of the indoor heat exchanger 24 decreases to a certain value or lower and the release signal is output from the indoor controller 70. The release signal is sent to the branch controller 60 through the signal conductor $S_1$.

If the temperature T is lower than the set value Ts, the heating operation start command is given from the branch controller 60 to the outdoor unit A (step I10) and the prescribed power level is commanded (step I11).

In this case, in the outdoor unit A, the compressors 1 and 2 are operated at the prescribed power level according to the command from the branch controller 60, the four-way valve 5 is operated, and the heating operations is started. At the same time, the "under operation" command is given from the outdoor unit A to the branch controller 60.

When the heating operation is started, refrigerant flows through the indoor heat exchanger 24.

In this case, if the indoor unit $C_1$ is normally connected, the temperature of the indoor heat exchanger 24 increases to a certain value or higher and the release signal is output from the indoor controller 70. The release sign is sent to the branch controller 60 through the signal conductor $S_1$.

In the branch controller 60, reception of "under operation" command is monitored (step I12).

If the "under operation" command is given to the branch controller 60, the timer 62 is set to "M" minutes (e.g. 10 min). The "M" minutes are the adequate duration required from the time the operation starts to the time the refrigeration cycle condition is stabilized.

At the same time, reception of the release signal from the indoor units $C_1$ through $C_3$ is monitored (steps I14, I15, and I17).

In this case, if the release signal is received from the indoor unit $C_1$, the step I21 starts However, if the release signal is received from the indoor unit $C_2$ instead of $C_1$, it is judged that the indoor units $C_1$ and $C_3$ are abnormally connected (step I18) and the step I21 starts.

If "M" minutes elapse before the release signal is received from any indoor unit (step I19), it is judged that the indoor unit $C_1$ is abnormally connected (step I20) and the step I21 starts.

In the step I21, it is checked if the indoor unit $C_2$ is judged to be abnormal.

If so, the step I35 starts.

If not, the PMV 31 is set to the opening proportional to the capacity of the indoor unit $C_2$ (capacity equivalent to that of the indoor heat exchanger 24) (step I22).

The current states of the PMVs 21 and 41 are maintained (step I23).

The timer 62 is set to "N" minutes (e.g. 5 min) (step I24). The "N" minutes are shorter than the above "M" minutes. Also, the timer 63 is set to 30 sec (step I25).

When 30 seconds set in the timer 63 elapse (step I26), the PMV 21 is fully closed (step I27).

In this case, if the indoor unit $C_2$ is normally connected, refrigerant flows through the indoor heat exchanger 34. Thus, the temperature of the indoor heat exchanger 34 increases to a certain value o higher and the release signal is output from the indoor controller 80. The release signal is sent to the branch controller 60 through the signal conductor $S_2$.

In the branch controller 60, reception of the release signal from the indoor units $C_1$ through $C_3$ is monitored (steps I28, I29, and I31).

In this case, if the release signal is received from the indoor unit $C_1$, the step I35 starts.

However, if the release signal is received from the indoor unit $C_1$ instead of $C_2$, it is judged that the indoor units $C_1$ and $C_2$ are abnormally connected (step I30) and the step I35 starts.

If the release signal is received from the indoor unit $C_3$ instead of $C_2$, it is judged that the indoor units $C_2$ and $C_3$ are abnormally connected (step I32) and the step I35 starts.

If "N" minutes elapse before the release signal is received from any indoor unit (step I33), it is judged that the indoor unit $C_2$ is abnormally connected (step I34) and the step I35 starts.

In the step I35, it is checked if the indoor unit $C_3$ is judged to be abnormal.

If so, the step I49 starts.

If not, the PMV 31 is set to the opening proportional to the capacity of the indoor unit $C_3$ (capacity equivalent to that of the indoor heat exchanger 34) (step I36).

The current states of the PMVs 21 and 31 are maintained (step I37).

The timer 62 is set to "N" minutes (step I38). Also, the timer 63 is set to 30 sec (step I39). When 30 seconds set in the timer 63 elapse (step I40), the PMV 31 is fully closed (step I41).

In this case, if the indoor unit $C_3$ is normally connected, refrigerant flows through the indoor heat exchanger 44. Thus, the temperature of the indoor heat exchanger 44 increases to a certain value or higher and the release signal is output from the indoor controller 90. The release signal is sent to the branch controller 60 through the signal conductor $S_3$.

In the branch controller 60, reception of the release signal from the indoor units $C_1$ through $C_3$ is monitored (steps I42, I43, and I45).

In this case, if the release signal is received from the indoor units $C_3$, the step I49 starts.

However, if the release signal is received from the indoor unit $C_1$ instead of $C_3$, it is judged that the indoor units $C_1$ and $C_3$ are abnormally connected (step I44) and the step I49 starts.

If the release signal is received from the indoor unit $C_2$ instead of $C_3$, it is judged that the indoor units $C_2$ and $C_3$ are abnormally connected (step I46) and the step I49 starts.

If "N" minutes elapse before the release signal is received from any indoor unit (step I47), it is judged that the indoor unit $C_3$ is abnormally connected (step I48) and the step I49 starts.

In the step I49, the PMV 41 is fully closed.

If any unit is judged to be abnormal, the error contents are commanded to the outdoor unit A (step I50). Then, the signal indicating the end of checking is sent from the branch controller 60 to the outdoor unit A (step I51).

In the outdoor unit A, the error contents are displayed on the indicator 54.

Therefore, it is possible to automatically, quickly, and accurately check if the refrigerant tubes and signal conductors $S_1$ through $S_3$ are normally connected between the outdoor unit A and the indoor units $C_1$ through $C_3$, especially between the branch unit B and the indoor units $C_1$ through $C_3$. Thus, the operator's load is decreased and proper operation is realized after installation.

Especially, because the compressors 1 and 2 are stopped for "t" minutes before checking is started, the following effect is expected. That is, even if normal operation for air conditioning is executed before checking, the operation does not affect the checking.

Moreover, the service life of the refrigeration cycle parts is improved because the checking time for the first indoor unit is set to "M" minutes which are necessary for the refrigeration cycle condition to be stabilized.

Therefore, when checking the second indoor unit forward, there is the advantage that the checking time is greatly decreased because it is set to "N" minutes which are necessary for the refrigerator condition to be stabilized.

If the release signal is output from any one of the indoor units $C_1$ through $C_3$ during checking, the refrigerant flow to the indoor units $C_1$ through $C_3$ is forcibly changed regardless of the above "M" and "N" minutes. Therefore, also from this point of view, the checking time is greatly decreased.

It is also possible to prevent the compressors 1 and 2 from being overloaded because the cooling or heating operation is selectively executed for checking according to the outdoor air temperature T. Therefore, the durability of the compressors 1 and 2 is improved.

The following is the description of the fourth embodiment of the present invention.

The refrigeration cycle has the same configuration as that of the first embodiment in FIG. 1.

The control circuit superficially has the same configuration as that of the first embodiment in FIG. 2.

However, the check mode routines of the outdoor controller 50 and the branch controller 60 are different from those of the first embodiment.

The check mode routine of the outdoor controller 50 is the same as that of the third embodiment in FIGS. 11A and 11B.

The check mode routine of the branch controller 6 is shown in FIGS. 13A through 13E, which is described below.

The timer 61 is set (step J1). The flag F is set to "0" (step J2), which memorizes whether or not the cooling operation is executed. The operation stop command is given to the indoor units $C_1$ through $C_3$ (step J3).

When "t" minutes set in the timer 61 elapse (step J4), the PMV 21 is set to the opening corresponding to the capacity of the indoor unit $C_1$ (capacity equivalent to that of the indoor heat exchanger 24) (step J5). The PMVs 31 and 41 are fully closed.

At the same time, the checking signal is sent from the branch controller 60 to the indoor units $C_1$ through $C_3$ (step J6).

It is checked if the flag F is set to "0" (step J7).

In this case, because the flag F is set to "0", the cooling operation start command is given from the branch controller 60 to the outdoor unit A (step J8) and the prescribed power level is commanded (step J9).

In this case, in the outdoor unit A, the compressors 1 and 2 are operated at the prescribed power level according to the command from the branch controller 60 to start the cooling operation. At the same time, the "under operation" command is given from the outdoor unit A to the branch controller 60.

When the cooling operation is started, refrigerant flows through the indoor heat exchanger 24.

In this case, if the indoor unit $C_1$ is normally connected, the temperature of the indoor heat exchanger 24 decreases to a certain value or lower and the release signal is output form the indoor controller 70. The release signal is sent to the branch controller 60 through the signal conductor $S_1$.

In the branch controller 60, reception of the "under operation" command is monitored (step J12). When the "under operation" command is given to the branch controller 60, the timer 62 is set to "M" minutes (e.g. 10 min) (step J13). The "M" minutes is the adequate duration required from the time the operation starts to the time the refrigeration cycle condition is stabilized.

At the same time, reception of the release signal from the indoor units $C_1$ through $C_3$ is monitored (steps J14, J15, and J17).

In this case, if the release signal is received from the indoor unit $C_1$, the step J21 starts.

However, if the release signal is received from the indoor unit $C_2$ instead of $C_1$, it is judged that the indoor units $C_1$ and $C_2$ are abnormally connected (step J16) and the step J21 starts.

If the release signal is received from the indoor unit $C_3$ instead of $C_1$, it is judged that the indoor units $C_1$ and $C_3$ are abnormally connected (step J18) and the step J21 starts.

If "M" minutes elapse before the release signal is received from any indoor unit (step J19), it is judged that the indoor unit $C_1$ is abnormally connected (step J20) and the step J21 starts.

In the step J21, it is checked if the indoor unit $C_2$ is judged to be abnormal.

If so, the step J35 starts.

If not, the PMV 31 is set to the opening proportional to the capacity of the indoor unit $C_2$ (capacity equivalent to that of the indoor heat exchanger 34) (step J22).

The current states of the PMVs 21 and 41 are maintained (step J23).

The timer 62 is set to "N" minutes (e.g. 5 min) (step J24). The "N" minutes are shorter than the above "M" minutes. Also, the timer 63 is set to 30 sec (step J25). When 30 seconds set in the timer 63 elapse (step J26), the PMV 21 is fully closed (step J27).

In this case, if the indoor unit $C_2$ is normally connected, refrigerant flows through the indoor heat exchanger 34. Thus, the temperature of the indoor heat exchanger 34 increases to a certain value or higher and the release signal is output from the indoor controller 80. The release signal is sent to the branch controller 60 through the signal conductor $S_2$.

In the branch controller 60, reception of the release signal from the indoor units $C_1$ through $C_3$ is monitored (steps J28, J29, and J31).

In this case, if the release signal is received from the indoor unit $C_1$, the step J35 starts.

However, if the release signal is received from the indoor unit $C_1$ instead of $C_2$, it is judged that the indoor units $C_1$ and $C_2$ are abnormally connected (step J30) and the step J35 starts.

If the release signal is received from the indoor unit $C_3$ instead of $C_2$, it is judged that the indoor units $C_2$ and $C_3$ are abnormally connected (step J32) and the step J35 starts.

If "N" minutes elapse before the release signal is received from any indoor unit (step J33), it is judged that the indoor unit $C_3$ is abnormally connected (step J34) and the step J35 starts.

In the step J35, it is checked if the indoor unit $C_3$ is judged to be abnormal.

If so, the step J49 starts.

If not, the PMV 31 is set to the opening proportional to the capacity of the indoor unit $C_3$ (capacity equivalent to that of the indoor heat exchanger 34) (step J36).

The current states of the PMVs 21 and 31 are maintained (step J37).

And the timer 62 is set to "N" minutes (step J38).

Moreover, the timer 63 is set to 30 sec (step J39).

When 30 sec set in the timer 63 elapse (step J40), the PMV 31 is fully closed (step J41).

In this case, if the indoor unit $C_3$ is normally connected, refrigerant flows through the indoor heat exchanger 44. Thus, the temperature of the indoor heat exchanger 44 increases to a certain value or higher and the release signal is output from the indoor controller 90. The release signal is sent to the branch controller 60 through the signal conductor $S_3$.

In the branch controller 60, reception of the release signal from the indoor units $C_1$ through $C_3$ is monitored (steps J42, J43, and J45).

In this case, if the release signal is received from the indoor unit $C_3$, the step J49 starts.

However, if the release signal is received from the indoor unit $C_1$ instead of $C_3$, it is judged that the indoor units $C_1$ and $C_3$ are abnormally connected (step J44) and the step J49 starts.

If the release signal is received from the indoor unit $C_2$ instead of $C_3$, it is judged that the indoor units $C_2$ and $C_3$ are abnormally connected (step J46) and the step J49 starts.

If "N" minutes elapse before the release signal is received from any indoor unit (step J47), it is judged that the indoor unit $C_3$ is abnormally connected (step J48), the step J49 starts.

In the step J49, the PMV 41 is fully closed.

It is checked if the flag F is set to "1" (step J50).

In this case, the flag F is still set to "0". Therefore, the flag F is set to "1" (step J51).

Then, the step J3 starts.

Because the flag F is set to "1" in the step J7, the heating operation command is given from the branch controller 60 to the outdoor unit A (step J10) and the prescribed power level is commanded (step J11).

In this case, in the outdoor unit A, the compressors 1 and 2 are operated at the prescribed power level according to the command from the branch controller 60 and the four-way valve 5 is operated to start the heating operation.

Thus, the same checking is repeated during the heating operation.

When the checking for the heating operation is completed, final judgment is executed.

If the indoor unit $C_1$ is judged to be abnormal for both the cooling and heating operations (step J52), it is finally judged that the indoor unit $C_1$ is abnormally connected (step J53).

Unless the indoor unit $C_1$ is judged to be abnormal for the cooling operation and the heating operation, it is finally judged that the indoor unit $C_1$ is normally connected (step J54).

If the indoor unit $C_2$ is judged to be abnormal for both the cooling and heating operations (step J55), it is finally judged that the indoor unit $C_2$ is abnormally connected (step J56).

Unless the indoor unit $C_2$ is judged to be abnormal for the cooling operation and the heating operation, it is finally judged that the indoor unit $C_2$ is normally connected (step J57).

If the indoor unit $C_3$ is judged to be abnormal for both the cooling and heating operations (step J58), it is finally judged that the indoor unit $C_3$ is abnormally connected (step J59).

Unless the indoor unit is judged to be abnormal for the cooling operation and heating operation, it is finally judged that the indoor unit $C_3$ is normally connected (step J60).

If any unit is finally judged to be abnormal, the error contents are commanded to the outdoor unit A step J61). Then, the signal indicating the end of checking is sent from the branch controller 60 to the outdoor unit A (step J62).

In the outdoor unit A, the error contents are displayed on the indicator 54.

Therefore, it is possible to automatically, quickly, and accurately check if the refrigerant tubes and signal conductors $S_1$ through $S_3$ are normally connected between the outdoor unit A and indoor units $C_1$ through $C_3$, especially between the branch unit B and the indoor units $C_1$ through $C_3$. Thus, the operator's load is decreased and proper operation is realized after installation.

Especially, because the compressors 1 and 2 are stopped for "t" minutes before checking is started, the following effect is expected. That is, even if the normal operation for air conditioning is executed before checking, the operation does not affect the checking.

Moreover, the service life of the refrigeration cycle parts is improved because the checking time for the first indoor unit is set to "M" minutes which are necessary for the refrigeration cycle condition to be stabilized.

Therefore, when checking the second indoor unit forward, there is the advantage that the checking time is greatly decreased because it is set to "N" minutes which are necessary for the refrigerator condition to be stabilized.

If the release signal is output from any one of the indoor units $C_1$ through $C_3$ during checking, the refrigerant flow to the indoor units $C_1$ through $C_3$ is forcibly changed regardless of the above "M" and "N" minutes. Therefore, also from this point of view, the checking time is greatly decreased.

Moreover, because indoor units are checked for both the cooling and heating operations, it is possible to prevent erroneous judgment due to the influence of outdoor and indoor air temperatures. Therefore, the checking reliability is improved.

In this fourth embodiment, the cooling operation is executed before the heating operation for checking. However, it is also permitted to execute the heating operation before the cooling operation.

The following is the description of the fifth embodiment of the present invention.

The refrigeration cycle has the same configuration as that of the first embodiment in FIG. 1.

The control circuit superficially has the same configuration as that of the first embodiment in FIG. 2.

However, the check mode routines of the outdoor controller 50 and the branch controller 60 are different from those of the first embodiment.

The check mode routine of the outdoor controller 50 is the same as that of the third embodiment in FIGS. 11A and 11B.

The check mode routine of the branch controller 60 is shown in FIGS. 14A through 14E, which is described below.

The timer 61 is set (step K1). The flag F is set to "0" (step K2), which memorizes whether or not the cooling operation is executed. The operation stop command is given to the indoor units $C_1$ through $C_3$ (step K3).

When "t" minutes set in the timer 61 elapse (step K4), the PMV 21 is set to the opening corresponding to the capacity of the indoor unit $C_1$ (capacity equivalent to that of the indoor heat exchanger 24) (step K5). The PMVs 31 and 41 are fully closed.

At the same time, the checking signal is sent from the branch controller 60 to the indoor units $C_1$ through $C_3$ (step K6).

It is checked if the flag F is set to "0" (step K7).

In this case, because the flag F is set to "0", the cooling operation start command is given from the branch controller 60 to the outdoor unit A (step K8) and the prescribed power level is commanded (step K9).

In this case, in the outdoor unit A, the compressors 1 and 2 are operated at the prescribed power level according to the command from the branch controller 60 to start the cooling operation. At the same time, the "under operation" command is given from the outdoor unit A to the branch controller 60. When the cooling operation is started, refrigerant flows through the indoor heat exchanger 24.

In this case, if the indoor unit $C_1$ is normally connected, the temperature of the indoor heat exchanger 24 decreases to a certain value or lower and the release signal is output from the indoor controller 70. The release signal is sent to the branch controller 60 through the signal conductor $S_1$.

In the branch controller 60, reception of the "under operation" command is monitored (step K12). When the "under operation" command is given to the branch controller 60, the timer 62 is set to "M" minutes (e.g. 10-min) (step K13). The "M" minutes is the adequate duration required from the time the operation starts to the time the refrigeration cycle condition is stabilized.

At the same time, reception of the release signal from the indoor units $C_1$ through $C_3$ is monitored (steps K14, K15, and K17).

In this case, if the release signal is received from the indoor unit $C_1$, the step K21 starts.

However, if the release signal is received from the indoor unit $C_2$ instead of $C_1$, it is judged that the indoor units $C_1$ and $C_2$ are abnormally connected (step K16) and the step K21 starts.

If the release signal is received from the indoor unit $C_3$ instead of $C_1$, it is judged that the indoor units $C_1$ and $C_3$ are abnormally connected (step K18) and the step K21 starts.

If "M" minutes elapse before the release signal is received from any indoor unit (step K19), it is judged that the indoor unit $C_1$ is abnormally connected (step K20) and the step K21 starts.

In the step K21, it is checked if the indoor unit $C_2$ is judged to be abnormal.

If so, the step K35 starts.

if not, the PMV 31 is set to the opening proportional to the capacity of the indoor unit $C_2$ (capacity equivalent to that of the indoor heat exchanger 24) (step K22).

The current states of the PMVs 21 and 41 are maintained (step K23).

The timer 62 is set to "N" minutes (e.g. 5 min) (step K24). Also, the timer 63 is set to 30 seconds (step K25).

When 30 seconds set in the timer 63 elapse (step K26), the PMV 21 is fully closed (step K27).

In this case, if the indoor unit $C_2$ is normally connected, refrigerant flows through the indoor heat exchanger 34. Thus, the temperature of the indoor heat exchanger 34 increases to a certain value or higher and the release signal is output from the indoor controller 80. The release signal is sent to the branch controller 60 through the signal conductor $S_2$.

In the branch controller 60, reception of the release signal from the indoor units $C_1$ through $C_3$ is monitored (steps K28, K29, and K31).

In this case, if the release signal is received from the indoor unit $C_1$, the step K35 starts.

However, if the release signal is received from the indoor unit $C_1$ instead of $C_2$, it is judged that the indoor units $C_1$ and $C_2$ are abnormally connected (step K30) and the step K35 starts.

If the release signal is received from the indoor unit $C_3$ instead of $C_2$, it is judged that the indoor units $C_2$ and $C_3$ are abnormally connected (step K32) and the step K35 starts.

If "N" minutes elapse before the release signal is received from any indoor unit (step K33), it is judged that the indoor unit $C_3$ is abnormally connected (step K34) and the step K35 starts.

In the step K35, it is checked if the indoor unit $C_3$ is judged to be abnormal.

If so, the step K49 starts.

If not, the PMV 31 is set to the opening proportional to the capacity of the indoor unit $C_3$ (capacity equivalent to that of the indoor heat exchanger 34) (step K36).

The current states of the PMVs 21 and 31 are maintained (step K37).

And the timer 62 is set to "N" minutes (step K38).

Moreover, the timer 63 is set to 30 seconds (step K39).

When 30 seconds set in the timer 63 elapse (step K40), the PMV 31 is fully closed (step K41).

In this case, if the indoor unit $C_3$ is normally connected, refrigerant flows through the indoor heat exchanger 44. Thus, the temperature of the indoor heat exchanger 44 increases to a certain value or higher and the release signal is output from the indoor controller 90. The release signal is sent to the branch controller 60 through the signal conductor $S_3$.

In the branch controller 60, reception of the release signal from the indoor units $C_1$ through $C_3$ is monitored (steps K42, K43, and K45).

In this case, if the release signal is received from the indoor units $C_3$, the step K49 starts.

However, if the release signal is received from the indoor unit $C_1$ instead of $C_3$, it is judged that the indoor units $C_1$ and $C_3$ are abnormally connected (step K44) and the step K49 starts.

If the release signal is received from the indoor unit $C_2$ instead of $C_3$, it is judged that the indoor units $C_2$ and $C_3$ are abnormally connected (step K46) and the step K49 starts.

If "N" minutes elapse before the release signal is received from any indoor unit (step K47), it is judged that the indoor unit $C_3$ is abnormally connected (step K48), the step K49 starts.

In the step K49, the PMV 41 is fully closed.

A series of judgment for the checking in the above cooling operation is called the first judgment.

It is checked if any unit is judged to be abnormal throughout the first judgment (step K50).

If not, the entire judgment is completed and the step K63 starts. In the step 63, the signal indicating the end of the checking is sent from the branch controller 60 to the outdoor unit A.

If so, however, it is checked if the flag F is set to "1" (step K51).

In this case, the flag F is still set to "0". Therefore, the flag F is set to "1" (step K52).

Then, the step K3 starts.

Because the flag F is set to "1" in the step K7, the heating operation command is given from the branch controller 60 to the outdoor unit A (step K10) and the prescribed power level is commanded (step K11).

In this case, in the outdoor unit A, the compressors 1 and 2 are operated at the prescribed power level according to the command from the branch controller 60 and the four-way valve 5 is operated to start the heating operation.

Thus, the same checking is repeated during the heating operation.

A series of judgment for the checking in the heating operation is called the second judgment.

It is checked if any unit is judged to be abnormal throughout the second judgment (step K50).

If not, the entire judgment is completed and the step K63 starts. In the step K63, the signal indicating the end of checking is sent from the branch controller 60 to the outdoor unit A.

When the checking in the heating operation is also completed, the final judgment is executed according to the results of the first and second judgment.

That is, if the indoor unit $C_1$ is judged to be abnormal for both the cooling and heating operations (step K53), it is finally judged that the indoor unit $C_1$ is abnormally connected (step K54).

Unless the indoor unit $C_1$ is judged to be abnormal for the cooling operation and the heating operation, it is finally judged that the indoor unit $C_1$ is normally connected (step K55).

If the indoor unit $C_2$ is judged to be abnormal for both the cooling and hating operations (step K56), it is finally judged that the indoor unit $C_2$ is abnormally connected (step K57).

Unless the indoor unit $C_2$ is judged to be abnormal for the cooling operation and the heating operation, it is finally judged that the indoor unit $C_2$ is normally connected (step K58).

If the indoor unit $C_3$ is judged to be abnormal for both the cooling and heating operations (step K59), it is finally judged that the indoor unit $C_3$ is abnormally connected (step K60).

Unless the indoor unit is judged to be abnormal for the cooling operation and heating operation, it is finally judged that the indoor unit $C_3$ is normally connected (step K61).

If any unit is finally judged to be abnormal, the error contents are commanded to the outdoor unit A (step K62). Then, the signal indicating the end of checking is sent form the branch controller 60 to the outdoor unit A (step K63).

In the outdoor unit A, the error contents are displayed on the indicator 54.

Therefore, it is possible to automatically, quickly, and accurately check if the refrigerant tubes and signal conductors $S_1$ through $S_3$ are normally connected between the outdoor unit A and indoor units $C_1$ through $C_3$, especially between the branch unit B and the indoor units $C_1$ through $C_3$. Thus, the operator's load is decreased and proper operation is realized after installation.

Especially, because the compressors 1 and 2 are stopped for "t" minutes before checking is started, the following effect is expected. That is, even if the normal operation for air conditioning is executed before checking, the operation does not affect the checking.

Moreover, the service life of the refrigeration cycle parts is improved because the checking time for the first indoor unit is set to "M" minutes which are necessary for the refrigeration cycle condition to be stabilized.

Therefore, when checking the second indoor unit forward, there if the advantage that the checking time is greatly decreased because it is set to "N" minutes which are necessary for the refrigerator condition to be stabilized.

If the release signal is output from any one of the indoor units $C_1$ through $C_3$ during checking, the refrigerant flow to the indoor units $C_1$ through $C_3$ is forcibly changed regardless of the above "M" and "N" minutes. Therefore, also from this point of view, the checking time is greatly decreased.

Moreover, because indoor units are checked for both the cooling and heating operations, it is possible to prevent erroneous judgment due to the influence of outdoor and indoor air temperatures. Therefore, the checking reliability is improved.

In this fifth embodiment, the cooling operation is executed before the heating operation for checking. However, it is also permitted to execute the heating operation before the cooling operation.

In each of the above embodiments, description is made for the case in which three indoor units are used. However, the number of indoor units is unlimited. Therefore, four or more units can be used.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An air conditioning apparatus comprising:
   an outdoor unit;
   compressing means installed in said outdoor unit for taking in, compressing, and discharging refrigerant;
   an outdoor heat exchanger installed in said outdoor unit for exchanging incoming refrigerant heat with outdoor air heat;
   a plurality of indoor units;
   an indoor heat exchanger installed in each of said indoor units for exchanging incoming refrigerant heat with indoor air heat;
   means for interconnecting said compressing means, said outdoor heat exchanger, and said indoor heat exchangers in a refrigeration cycle;
   a temperature sensor on each of said indoor heat exchangers for detecting a temperature of a respective indoor heat exchanger;
   operating means, connected to said indoor units and said outdoor unit, for signaling a check mode in which erroneous connections between said indoor units and said outdoor unit are checked;
   flow means, responsive to said check mode, for stopping said compressing means for a predetermined time period following initiation of said check mode and then restarting said compressing means to cause refrigerant to flow through each one of said indoor units sequentially;
   signal means installed in each of said indoor units for outputting a temperature signal associated with an indoor unit when, in said check mode, a temperature sensor associated with that indoor unit detects a temperature exceeding a threshold temperature value;
   check means for monitoring, during each successive flow of refrigerant through each successive indoor unit in said check mode, said temperature signals from said indoor units and judging if said indoor units ar normally connected to said outdoor unit;
   an outdoor temperature sensor for detecting outdoor air temperature; and
   means for controlling, in said check mode, a power level of said compressing means according to said outdoor air temperature.

2. An apparatus according to claim 1, wherein; said operating means is installed on said outdoor unit.

3. An apparatus according to claim 1, wherein said flow means controls said compressor means to cause refrigerant to sequentially flow through each indoor unit for a prescribed period of time.

4. An apparatus according to claim 3, wherein said flow means forcibly switches the refrigerant flow to a subsequent indoor unit regardless of said prescribed period of time in response to a temperature signal.

5. An air conditioning apparatus comprising:
   an outdoor unit;
   compressing means installed in said outdoor unit for taking in, compressing, and discharging refrigerant;
   an outdoor heat exchanger installed in said outdoor unit for exchanging incoming refrigerant heat with outdoor air heat;
   a plurality of indoor units;
   an indoor heat exchanger installed in each of said indoor units for exchanging incoming refrigerant heat with indoor air heat;
   means for interconnecting said compressing means, said outdoor heat exchanger, and said indoor heat exchangers in a refrigeration cycle;
   a temperature sensor on each of said indoor heat exchangers for detecting a temperature of a respective indoor heat exchanger;
   operating means, connected to said indoor units and said outdoor unit, for signaling a check mode in which erroneous connections between said indoor units and said outdoor unit are checked;
   flow means, responsive to said check mode, for stopping said compressing means for a predetermined time period following initiation of said check mode and then restarting said compressing means to cause refrigerant to flow through each one of said indoor units sequentially;
   signal means installed in each of said indoor units for outputting a temperature signal associated with an indoor unit when, in said check mode, a temperature sensor associated with that indoor unit detects a temperature exceeding a threshold temperature value;
   check means for monitoring, during each successive flow of refrigerant through each successive indoor unit in said check mode, said temperature signals from said indoor units and judging if said indoor units are normally connected to said outdoor unit;

a means for setting a cooling operation in which refrigerant is discharged from said compressing means, passes through said outdoor heat exchanger, passes through at least one of said indoor heat exchangers and returns to said compressing means;

a means for setting a heating operation in which refrigerant is discharged from said compressing means, passes through at least one of said indoor heat exchangers, passes through said outdoor heat exchanger and returns to said compressing means;

an outdoor air temperature sensor for detecting an outdoor air temperature; and a means for selectively executing, in said check mode, one of said cooling and heating operations according to said detected outdoor air temperature.

6. An air conditioning apparatus comprising:

an outdoor unit;

compressing means installed in said outdoor unit for taking in, compressing, and discharging refrigerant;

an outdoor heat exchanger installed in said outdoor unit for exchanging incoming refrigerant heat with outdoor air heat;

a plurality of indoor units;

an indoor heat exchanger installed in each of said indoor units for exchanging incoming refrigerant heat with indoor air heat;

means for interconnecting said compressing means, said outdoor heat exchanger, and said indoor heat exchangers in a refrigeration cycle;

a temperature sensor on each of said indoor heat exchangers for detecting a temperature of a respective indoor heat exchanger;

operating means, connected to said indoor units and said outdoor unit, for signaling a check mode in which erroneous connections between said indoor units and said outdoor unit are checked;

flow means, responsive to said check mode, for stopping said compressing means for a predetermined time period following initiation of said check mode and then restarting said compressing means to cause refrigerant to flow through each one of said indoor units sequentially;

signal means installed in each of said indoor units for outputting a temperature signal associated with an indoor unit when, in said check mode, a temperature sensor associated with that indoor unit detects a temperature exceeding a threshold temperature value;

check means for monitoring, during each successive flow of refrigerant through each successive indoor unit in said check mode, said temperature signals from said indoor units and judging if said indoor units are normally connected to said outdoor unit;

a means for setting a cooling operation in which refrigerant is discharged from said compressing means, passes through said outdoor heat exchanger, passes through at least one of said indoor heat exchangers and returns to said compressing means;

a means for setting a heating operation in which refrigerant is discharged from said compressing means, passes through at least one of said indoor heat exchangers, passes through said outdoor heat exchanger and returns to said compressing means; and a means for first executing, in said check mode, one of said cooling and heating operations and subsequently executing one of said cooling and heating operations not executed in said first execution.

7. An apparatus according to claim 6, wherein said checking means makes a first normality judgment of said indoor units during said first execution, makes a second normality judgment during said subsequent execution, and makes a final abnormality judgment based on said first and second normality judgments.

8. An apparatus according to claim 7, wherein said checking means completes normality judgment when said first normality judgment of said indoor units is normal.

9. An apparatus according to claim 8, wherein said compressing means stop when said checking means completes said normality judgment.

10. An air conditioning apparatus comprising:

an outdoor unit;

compressing means installed in said outdoor unit for taking in, compressing, and discharging refrigerant;

an outdoor heat exchanger installed in said outdoor unit for exchanging incoming refrigerant heat with outdoor air heat;

a plurality of indoor units;

an indoor heat exchanger installed in each of said indoor units for exchanging incoming refrigerant heat with indoor air heat;

means for interconnecting said compressing means, said outdoor heat exchanger, and said indoor heat exchangers in a refrigeration cycle;

a temperature sensor on each of said indoor heat exchangers for detecting a temperature of a respective indoor heat exchanger;

operating means, connected to said indoor units and said outdoor unit, for signaling a check mode in which erroneous connections between said indoor units and said outdoor unit are checked;

flow means, responsive to said check mode, for stopping said compressing means for a predetermined time period following initiation of said check mode and then restarting said compressing means to cause refrigerant to flow through each one of said indoor units sequentially;

signal means installed in each of said indoor units for outputting a temperature signal associated with an indoor unit when, in said check mode, a temperature sensor associated with that indoor unit detects a temperature exceeding a threshold temperature value;

check means for monitoring, during each successive flow of refrigerant through each successive indoor unit in said check mode, said temperature signals from said indoor units and judging if said indoor units are normally connected to said outdoor unit; and said flow means causing, in said check mode, refrigerant to flow through a first indoor unit for "M" hours, and causing refrigerant to flow through subsequent indoor units for "N" hours, where N is a number less than M.

* * * * *